United States Patent
Zhang et al.

(10) Patent No.: US 10,005,915 B2
(45) Date of Patent: Jun. 26, 2018

(54) HIGH-STRETCH ENERGY CURABLE INKS AND METHOD OF USE IN HEAT TRANSFER LABEL APPLICATIONS

(71) Applicant: SUN CHEMICAL CORPORATION, Parsippany, NJ (US)

(72) Inventors: Yuemei Zhang, Ramsey, NJ (US); Nicholas Tulling, Rutherford, NJ (US); Jitendra Modi, Hazlet, NJ (US); Leonard Davis, Monroe, NY (US); Stephen Anthony Hall, Wells (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days. days.

(21) Appl. No.: 15/002,576

(22) Filed: Jan. 21, 2016

(65) Prior Publication Data
US 2016/0137857 A1    May 19, 2016

Related U.S. Application Data

(63) Continuation of application No. 14/235,539, filed as application No. PCT/US2012/049079 on Jul. 31, 2012, now Pat. No. 9,275,560.

(60) Provisional application No. 61/513,727, filed on Aug. 1, 2011.

(51) Int. Cl.
| | |
|---|---|
| *B41M 1/40* | (2006.01) |
| *B41M 3/12* | (2006.01) |
| *C09D 11/101* | (2014.01) |
| *B41M 5/40* | (2006.01) |
| *B32B 38/00* | (2006.01) |
| *C09D 11/103* | (2014.01) |
| *C09D 161/24* | (2006.01) |
| *G09F 3/04* | (2006.01) |
| *G09F 3/10* | (2006.01) |
| *C09D 11/03* | (2014.01) |
| *C09D 11/037* | (2014.01) |
| *G09F 3/02* | (2006.01) |
| *C08K 3/34* | (2006.01) |
| *C08K 3/36* | (2006.01) |

(52) U.S. Cl.
CPC .......... *C09D 11/101* (2013.01); *B32B 38/145* (2013.01); *B41M 1/40* (2013.01); *B41M 3/12* (2013.01); *B41M 5/405* (2013.01); *C09D 11/03* (2013.01); *C09D 11/037* (2013.01); *C09D 11/103* (2013.01); *C09D 161/24* (2013.01); *G09F 3/04* (2013.01); *G09F 3/10* (2013.01); *C08K 3/34* (2013.01); *C08K 3/36* (2013.01); *G09F 2003/0257* (2013.01); *Y10T 428/24843* (2015.01)

(58) Field of Classification Search
CPC .......... B41M 1/40; B41M 3/12; B41M 5/405; C09D 11/101
USPC ............ 428/32.79, 32.86; 156/240; 524/512; 525/463
See application file for complete search history.

(56) References Cited

U.S. PATENT DOCUMENTS

| | | |
|---|---|---|
| 8,105,679 B2 | 1/2012 | Jonai et al. |
| 8,952,078 B2 | 2/2015 | Gould |
| 2001/0012665 A1 | 8/2001 | Yoon |
| 2007/0084372 A1 | 4/2007 | Sloan |
| 2010/0272966 A1 | 10/2010 | Gould et al. |

FOREIGN PATENT DOCUMENTS

| | | |
|---|---|---|
| JP | S62-070465 | 3/1987 |
| JP | H10-315630 | 12/1998 |
| WO | WO-2010/125373 A1 | 11/2010 |

OTHER PUBLICATIONS

International Search Report from International Application No. PCT/US2012/049079, dated Nov. 8, 2012.
European Search Report issued in European Application No. 12748612.4, dated Jun. 3, 2016.
Japanese Office Action issued in Japanese Application No. 2014-524037, dated Feb. 13, 2017. (with English Translation).

*Primary Examiner* — Bruce H Hess
(74) *Attorney, Agent, or Firm* — Charles C. Achkar; Ostrolenk Faber LLP

(57) ABSTRACT

Provided are energy curable high-stretch inks and coatings for heat transfer labels. The inks and coatings include monofunctional monomers/oligomers, thermoplastic inert resins, and zero or a limited amount of multifunctional monomers/oligomers and exhibit good stretchability and surface resistance, such as scratch resistance and solvent (water, oil) resistance. Also provided are methods of using the high stretch inks in heat-transfer label (HTL) applications.

37 Claims, No Drawings

HIGH-STRETCH ENERGY CURABLE INKS AND METHOD OF USE IN HEAT TRANSFER LABEL APPLICATIONS

CROSS REFERENCE TO RELATED APPLICATIONS

This application is a continuation of U.S. application Ser. No. 14/235,539, filed Mar. 17, 2014, which is a § 371 National Phase Application of International Application No. PCT/US2012/049079 filed Jul. 31, 2012, which claims the benefit to U.S. Provisional Application Ser. No. 61/513,727, filed Aug. 1, 2011, the subject matter of each of which is incorporated by reference in its entirety.

Where permitted, the subject matter of the above-referenced provisional application is incorporated by reference herein in its entirety.

FIELD OF THE INVENTION

The present invention relates generally to heat-transfer labels and more particularly to heat-transfer labels that include inks and coatings that exhibit good stretchability.

BACKGROUND

Heat-transfer labels (HTLs) are commonly used in the decorating and/or labeling of commercial articles, such as, and without limitation to, containers for beverages (including alcoholic beverages, such as beer), foods, essential oils, detergents, adverse chemicals, as well as health and beauty aids. A heat-transfer label (HTL) generally includes a carrier web, a release layer of wax or non-wax coat applied to the carrier web, and an ink image printed on the release layer. The ink image is typically transferred to articles by application of heat and pressure, as described in U.S. Pat. No. 3,616,015, one of the most well known patents on heat transfer technology. UV and heat curable heat transfer labels are known in the art (e.g., see U.S. Pat. Nos. 4,231,742; 4,624,891; 5,342,725; 5,800,656; 6,042,676; 6,391,415; 6,423,406; 6,509,075; 7,014,895; 7,160,411 and U.S. Pat. Appl. Pub. No. 20120070595).

Commercially available HTL inks generally are solvent-based or water-based systems. Mandates issued by many governments to limit the volatile organic compounds (VOCs) used in industry, however, have triggered development of ultraviolet (UV) and electron beam (EB) curable inks due to their nearly 100% active components and minimal VOCs. Such systems are considered more environmentally friendly. Since the energy curable systems do not depend on evaporation of a solvent, process control can be maintained even if a coating or printing machine needs to be stopped during application. In addition, UV/EB curable inks also exhibit much better water resistance than water-based systems. Energy consumed in the drying process for UV/EB inks and coatings is lower than energy consumed in traditional oven drying of water-based or solvent-based inks and coatings. The increased speed of curing of radiation curing also reduces production time and thus increases efficiency.

Container design has evolved from generally cylindrical containers to containers that are tapered, contoured, curved or variously shaped. These contours and variation in shape of the container can lead to difficulties in application of a heat transfer label. Traditional inks and coating do not exhibit sufficient stretch, flexibility and/or extension to conform to the various shapes of some modern container designs that include more contours and unusual shapes without cracking or forming substantial defects in the heat transfer label or decoration.

Accordingly, a need exists for energy curable inks and/or coating compositions that exhibit good stretchability for use in forming flexible and extensible cured inks and coatings, such as for use in heat transfer labels. There is also a need for a sufficiently flexible and extensible heat transfer label formed from one or more curable inks and/or compositions that are adaptable for the more unusual shapes and contours of modern containers and efficient and economic methods of applying heat transfer labels.

SUMMARY OF THE INVENTION

Provided are high-stretch energy curable inks and coatings and methods for the fabrication of heat-transfer label applications for use in the decorating and/or labeling of commercial articles and other applications using the high-stretch energy curable inks and coatings. Also provided are energy curable lithographic inks that demonstrate good litho printability, fast cure, and stretch 25% or more without cracking when printed up to 5 layers with multi color traps with or without first down clear coating and with or without last down white. Also provided are energy curable inks and their use in heat-transfer label (HTL) applications and more particularly to methods of using the UV/EB curable offset inks in multi-layer HTL applications that require high stretch during the heat-transfer process, which is required by some modern container designs that include more unusual shapes. Also provided are energy curable inks and coatings that when cured are resistant to abrasion, water, chemicals, and heat, and exhibit good flexibility and extensibility.

Also provided are heat transfer labels containing one or more layers of the stretchable inks and/or coatings provided herein. The heat transfer labels can include a carrier, such as a carrier film, on which the heat transfer label is supported. The heat transfer label also can include a release layer that facilitates separation of the heat transfer label from the carrier when the heat transfer label is applied to a container.

Also provided are energy curable inks and/or coating compositions that form flexible, stretchable inks and/or coatings when cured, and the cured inks and/or coatings formed therefrom. The ink compositions and/or coating compositions can include 80 wt % or greater monofunctional monomers/oligomers and inert resins, such as inert thermoplastic resins or a combination thereof, and 20 wt % or less of multifunctional monomers and oligomers and, optionally, a viscosity modifier and/or other additives. The viscosity modifier can be a monofunctional monomer, a thermoplastic resin, or any combination thereof. The ink and/or coating compositions can be cured using any suitable actinic radiation, e.g., ultraviolet (UV) light or electron beam (EB) radiation. Also provided are methods of labeling or decorating a container with a flexible and extensible heat transfer label. Exemplary methods can include as steps printing at least one layer of an energy curable ink or coating provided herein on the release side of a carrier film, curing the at least one layer of energy curable ink or coating using actinic radiation to produce a cured print, forming the cured print into a heat transfer label, and applying the heat transfer label to a substrate, where the heat transfer label can stretch 25% or more without cracking. Also provided are containers labeled and/or decorated with a flexible and extensible heat transfer label as described herein.

DETAILED DESCRIPTION OF THE INVENTION

It is to be understood that the foregoing general description and the following detailed description are exemplary and explanatory only and are not restrictive of any subject matter claimed.

The section headings used herein are for organizational purposes only and are not to be construed as limiting the subject matter described.

I. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

In this application, the use of the singular includes the plural unless specifically stated otherwise. In this application, the use of "or" means "and/or" unless stated otherwise. As used herein, use of the term "including" as well as other forms, such as "includes," and "included," is not limiting.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the words "a" or "an" are to be taken to include both the singular and the plural. Conversely, any reference to plural items shall, where appropriate, include the singular. As used herein, "multifunctional" means having two or more functional groups.

A multifunctional monomer, e.g., can be a di-functional, tri-functional, tetra-functional or have a higher number of functional groups. For example, a multifunctional acrylate includes diacrylates, triacrylates and tetraacrylates.

As used herein, the term "stretch" refers to extending or elongating or increasing in dimension.

As used herein, the term "stretchability" refers to the ability of a material to be stretched in dimension.

As used herein, "blend" refers to a combination of two or more components.

As used herein, "%stretch" refers to the percentage increase in dimension. For example, if the length of a test portion of a label is measured at 1 inch before stretch and then 1.25 inches after stretch, it is said to have been stretched by or to exhibit a stretch of 25% (an increase in length of 25% based on the original length). The phrase "25% stretch" means that the original dimension, e.g. length, increased by 25%.

As used herein, "high stretch" refers to a %stretch of at least 20% stretch without cracking.

As used herein, the phrase "without cracking" means no visual signs of cracking are observed when inspected visually without the aid of any instrument.

As used herein, the term "inert resin" refers to a resin that does not react with monomers/oligomers in the resin composition.

As used herein, the term "thermoplastic resin" refers to an inert resin containing organic polymer compounds, which can include linear polymers, where the inert resin exhibits its plasticity upon heating.

As used herein, "monomer" refers to a material having a viscosity less than that of an oligomer and a relatively low molecular weight (i.e., having a molecular weight less than about 750 g/mole) and containing one or more polymerizable groups, which are capable of polymerizing and combining with other monomers or oligomers to form other oligomers or polymers. A monomer can have a viscosity of 150 cP or less measured at 25° C. at a shear rate of about 4 to 20 $sec^{-1}$ with a Brookfield viscometer. A monomer can be used to modulate the viscosity of an oligomer.

As used herein, "oligomer" refers to a material having a viscosity greater than that of a monomer and a relatively intermediate molecular weight (i.e., having a molecular weight greater than about 750 g/mole but generally less than 100,000 g/mole) having one or more radiation polymerizable groups, which are capable of polymerizing and combining with monomers or oligomers to form other oligomers or polymers. The number average molecular weight of the oligomer is not particularly limited and can be, for example, between about 750-10,000 g/mole. Molecular weight can be selected to achieve the desired viscosity, modulus, solvent resistance and other important properties. Oligomer molecular weight and its distribution can be determined by gel permeation chromatography.

As used herein, "polymer" refers to a high viscosity molecule comprising a substructure formed from one or more monomeric, oligomeric, and/or polymeric constituents polymerized or cross-linked together. The monomer and/or oligomer units can be regularly or irregularly arranged and a portion of the polymer chemical structure can include repeating units.

As used herein, the term "molecular weight" means number average molecular weight unless expressly noted otherwise.

As used herein, "cure" or "curing" refers to a process that leads to polymerizing, hardening and/or cross-linking of monomer and/or oligomer units to form a polymer. Curing can occur via any polymerization mechanism, including, e.g., free radical routes, and/or in which polymerization is photoinitiated, and can include the use of a radiation sensitive photoinitiator.

As used herein, the terms "curable resin," "curable ink" and "curable coating" refer to an ability of a resin, ink and coating, respectively, to polymerize, harden, and/or cross link in response to suitable curing stimulus such as ultraviolet (UV) energy, infrared (IR) energy, light emitting diode (LED) energy, electron beam (EB) energy, heat energy, or other source of energy, with appropriate initiators included in the resin, ink or coating if required. A curable resin, ink or coating typically is liquid at 25° C. prior to curing. A curable resin can be a component of a curable ink or coating, and a curable ink or curable coating is used to print a substrate, forming a film of printed ink or coating. The film of curable ink or coating then is cured, hardening, polymerizing and/or cross-linking the ink or coating to form a cured ink or coating.

As used herein, the term "cured ink" or "cured coating" refers to a curable ink or coating that has been polymerized. In a cured ink or coating, the curable components of a curable ink or curable coating react upon curing to form a polymerized or cross-linked network. On curing, the liquid or fluid curable ink or coating cross-links, polymerizes and/or hardens to form a film of cured ink or cured coating. When the curable ink or curable coating cures from a liquid state to a solid state, the curable monomers and/or oligomers form (1) chemical bonds, (2) mechanical bonds, or (3) a combination of a chemical and mechanical bonds. As a result, the cured high stretch ink or coating provided herein can undergo stretching of 25% or more without cracking.

As used herein, "radiation curable" refers to curing in response to exposure to suitable radiation such as ultra violet (UV) radiation, light emitting diode (LED) energy, infrared or electron beam radiation. The term "radiation curable" is intended to cover all forms of curing upon exposure to a radiation source. The energy source used to initiate cross-linking of the radiation-curable components of the composition can be actinic, such as radiation having a wavelength in the ultraviolet or visible region of the spectrum; accelerated particles, such as electron beam radiation; or thermal, such as heat or infrared radiation. Suitable sources of actinic radiation include mercury lamps, xenon lamps, carbon arc lamps, tungsten filament lamps, lasers, light emitting diodes, sunlight, and electron beam emitters. The curing light can be filtered or focused.

Throughout this disclosure, all parts and percentages are by weight (wt % or mass % based on the total weight) and all temperatures are in ° C., unless otherwise indicated.

II. High-Stretch Energy Curable Ink and Coating Compositions

The present application is directed to a set of novel energy curable inks and coatings, including litho inks, and a method of providing heat transfer labels (HTL) that can withstand 25% stretch or more, without cracking, printed up to 5 layers trap (5 layers of trapped ink) with multi color traps with first down clear coating and with or without last down white. For the purposes of the present application, a passing result for stretch is when there is no visual evidence of cracking. A failing result is when there is visual evidence of cracking, even if the cracks are small. This represents a significant improvement over commercially available inks as shown in the Examples. The UV curable inks and coatings provided herein contains zero, or very limited amounts, of multifunctional monomers/oligomers while still providing acceptable surface resistance (such as scratch resistance and solvent (water, oil) resistance) and 25% or more stretchability. This is very different from current commercial products, which are mainly composed of multifunctional monomers/oligomers which are utilized for the fastest cure speed. The novel HTL offset ink system and method of use is mainly composed of fast curing monofunctional monomers/oligomers, such as acrylate/methacrylate monofunctional monomers/oligomers, and inert thermoplastic resins that do not react with the monomers/oligomers for the best stretchability.

The present application relates mainly to free radical UV lithographic inks, however, the resin composition provided herein can be used for formulating other inks including offset, flexo, gravure, or any other type of printing ink system for HTL application that has a requirement for ink stretchability during label transfer process under heat. The high-stretch energy curable compositions are not limited to free radical UV curable ink and coating systems. The high-stretch energy curable compositions can be formulated for cationic systems and for EB curing and all other actinic curing systems as well. In addition, the high-stretch energy curable compositions are not limited to (meth)acrylate materials or free radical polymerization. The high-stretch energy curable compositions can be formulated for cationic epoxy systems and many other polymerizable functional groups as long as the cured polymer is a thermoplastic polymer. Though there are examples of specific UV litho inks in the present application, the method of providing heat transfer labels that will stretch 25% or more without cracking encompasses other ink types as well.

The high-stretch energy curable compositions provided herein include a resin composition and optionally other ingredients, such as one or more colorants, one or more inhibitors, one or more viscosity modifiers, one or more photoinitiators and one or more additives. In clear coat compositions, colorants can be excluded, although in some applications, optical brighteners or other colorants can be included. For example, dye or pigments or both can be included to provide pigmented coatings to provide a clear coat of a specific color or shade, or to produce a pearlescent or metallic effect. In white ink formulations, mineral pigments, such as $TiO_2$, can be included. The resin compositions included in the high-stretch energy curable compositions, as described below, generally contain 80 wt % or greater monofunctional monomers/oligomers and inert thermoplastic resins or a combination thereof. Energy curable compositions, such as inks and coatings, that include the provided resin compositions, when cured are capable of being stretched 25% or more without any visual cracking at varied color densities and when present as single or multiple layers in a heat transfer label.

A. Resin Compositions

Provided are resin compositions for energy curable compositions. The resin compositions provided herein exhibit high stretch after curing and are suitable for applications in which stretchability of the compositions is desirable. An example of an application where stretchability of the composition is desirable is heat transfer labels. It has been determined that resin compositions containing 80 wt % or greater monofunctional monomers/oligomers and inert thermoplastic resins or a combination thereof and 20 wt % or less of multifunctional monomers and oligomers, such as di-, tri-, tetra or higher functional groups (2 or more functional groups) can be used in energy curable inks and/or coatings, which cure at acceptable rates and produce heat transfer labels and decorations that are capable of being stretched 25% or more without any visual cracking at varied color densities and at single or multiple layers. The resin compositions can be 80 wt % or greater of a solution of inert resin in monofunctional monomers/oligomers.

1. Monofunctional Monomers/Oligomers

The monofunctional monomers/oligomers in the resin compositions provided herein are selected to be compatible with the other materials in the composition, to promote fast cure speed, and to produce coatings that are tack free under normal curing conditions on a commercial press. The monofunctional monomers/oligomers preferably have a Tg above 0° C., such as in the range of 10° C. to 100° C. In some applications, the monofunctional monomers/oligomers are selected to have a Tg at or about room temperature (20° C.-25° C.).

For the high-stretch energy curable inks and coating compositions provided herein formulated for lithographic application, the monofunctional monomers/oligomers and inert resins are selected to yield an ink or coating with good fountain compatibility and lithographic properties.

In some applications, the monofunctional monomers/oligomers and resins in the inks of the present application exhibit tack in the range of 8-20, or in the range of 10-16.

The resin compositions can contain 80 wt % or greater monofunctional monomers/oligomers. In some applications, the amount of monofunctional monomers/oligomers can be between 80 wt % and 99 wt % of the resin composition.

In some applications, the amount of monofunctional monomers/oligomers in the resin composition is greater than 85 wt %, or greater than 90 wt % or greater than 95 wt % based on the total weight of the resin composition. In some applications, monofunctional monomers or monofunctional oligomers or a combination thereof are present in a range between 85 wt % and 99 wt %, or in a range between 90 wt % and 99.5 wt %.

In some applications, the amount of monofunctional monomers or monofunctional oligomers or a combination thereof in the resin composition can be greater than 20 wt %, or greater than 25 wt %, or greater than 30 wt %, or greater than 35 wt %, or greater than 40 wt %, or greater than 45 wt %, or greater than 50 wt %, or greater than 55 wt %, or greater than 60 wt %, or greater than 65 wt %, or greater than 70 wt %, or greater than 75 wt %, or greater than 80 wt %, or greater than 85 wt %, or greater than 90 wt %, based on the total weight of the resin composition. In some applications, monofunctional monomers or monofunctional oligomers or a combination thereof are present in an amount that is 50 wt %, 50.5 wt %, 51 wt %, 51.5 wt %, 52 wt %, 52.5 wt %, 53 wt %, 53.5 wt %, 54 wt %, 54.5 wt %, 55 wt %, 55.5 wt %, 56 wt %, 56.5 wt %, 57 wt %, 57.5 wt %, 58 wt %, 58.5 wt %, 59 wt %, 59.5 wt %, 60 wt %, 60.5 wt %, 61 wt %, 61.5 wt %, 62 wt %, 62.5 wt %, 63 wt %, 63.5 wt %, 64 wt %, 64.5 wt %, 65 wt %, 65.5 wt %, 66 wt %, 66.5 wt %, 67 wt %, 67.5 wt %, 68 wt %, 68.5 wt %, 69 wt %, 69.5 wt %, 70 wt %, 70.5 wt %, 71 wt %, 71.5 wt %, 72 wt %, 72.5 wt %, 73 wt %, 73.5 wt %, 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt %, 80 wt %, 80.5 wt %, 81 wt %, 81.5 wt %, 82 wt %, 82.5 wt %, 83 wt %, 83.5 wt %, 84 wt %, 84.5 wt %, 85 wt %, 85.5 wt %, 86 wt %, 86.5 wt %, 87 wt %, 87.5 wt %, 88 wt %, 88.5 wt %, 89 wt %, 89.5 wt %, 90 wt %, 90.5 wt %, 91 wt %, 91.5 wt %, 92 wt %, 92.5 wt %, 93 wt %, 93.5 wt %, 94 wt %, 94.5 wt %, 95 wt %, 95.5 wt %, 96 wt %, 96.5 wt %, 97 wt %, 97.5 wt %, 98 wt %, 98.5 wt %, 99 wt % or 99.5 wt % by weight of the resin composition.

The ratio of monofunctional monomer to monofunctional oligomer, when present, can vary from 100:1 to 100:1, including all permutations therebetween. For example, the ratio of the amount of monofunctional monomer to monofunctional oligomer can be 10:1, 9:1, 8:1, 7:1, 6:1, 5:1, 4:1, 3:1, 2:1, 1:1, 1:2, 1:3, 1:4, 1:5, 1:6, 1:7, 1:8, 1:9 or 1:10.

Examples of monofunctional monomers/oligomers in the resin compositions provided herein include acrylate esters, acrylic esters, acrylic monomer, N-acryloyl amine, N-acryloyl morpholine, aliphatic mono acrylate, aliphatic mono methacrylate, alkoxylated lauryl acrylate, alkoxylated phenol acrylate, alkoxylated tetrahydrofurfuryl acrylate, $C_{12}$-$C_{14}$ alkyl methacrylate, aromatic acrylate monomer, aromatic methacrylate monomer, benzyl methacrylate, caprolactone acrylate, cyclic trimethylolpropane formal acrylate, cycloaliphatic acrylate monomer, dicyclopentadienyl methacrylate, diethylene glycol methyl ether methacrylate, epoxy acrylate, epoxy methacrylate, 2(2-ethoxyethoxy)ethyl acrylate, ethoxylated (4) nonyl phenol acrylate, ethoxylated (4) nonyl phenol methacrylate, ethoxylated nonyl phenol acrylate, 2-ethylhexyl methacrylate, isobornyl acrylate, isobornyl methacrylate, isodecyl acrylate, isodecyl acrylate, isodecyl methacrylate, isooctyl acrylate, isooctyl acrylate, lauryl acrylate, lauryl methacrylate, methoxy polyethylene glycol (350) monoacrylate, methoxy polyethylene glycol (350) monomethacrylate, methoxy polyethylene glycol (550) monoacrylate, methoxy poly-ethylene glycol (550) monomethacrylate, nonylphenylpolyoxyethylene acrylate, octyldecyl acrylate, 2-phenoxyethyl acrylate, 2-phenoxyethyl methacrylate, polyester acrylate, polyester(meth)acrylate, polyether acrylate, polyether methacrylate, poly-phenoxy acrylates, stearyl acrylate, stearyl methacrylate, tetrahydrofurfuryl acrylate, tetrahydrofurfuryl methacrylate, tridecyl acrylate, tridecyl methacrylate, triethylene glycol ethyl ether methacrylate, 3,3,5-trimethylcyclohexyl methacrylate, 3,3,5-trimethyl-cyclo-hexyl methacrylate, urethane acrylate, urethane methacrylate, urethane oligomer, an acrylated diol oligomer (e.g., SARTOMER 2000 oligomer, an unsaturated aliphatic ester which is a polyol polyacrylate), an oligomer in which a (meth)acryloyl group is bound to one terminal of polymethyl(meth)acrylate, poly-n-butyl(meth)acrylate, poly-i-butyl(meth)acrylate or polystyrene (e.g., a polystyrene oligomer having a methacryloyl group at one terminal (Mn=6000, trade name: AS-6, manufactured by Toagosei Co., Ltd.), a polymethyl methacrylate oligomer having a methacryloyl group at one terminal (Mn=6000, trade name: AA-6, manufactured by Toagosei Co., Ltd.), and a poly-n-butylacrylate oligomer having a methacryloyl group at one terminal (Mn=6000, trade name: AB-6, manufactured by Toagosei Co., Ltd.), polyurethane acrylate oligomer, polyurethane methacrylate oligomer, one-end acryloylated polymethyl methacrylate oligomer, one-end methacryloylated polystyrene oligomer, one-terminal-end methacryloylated polyethylene glycol, epoxy methacrylate, polyether methacrylate, polyester methacrylate, polyurethane methacrylate, polyol methacrylates, melamine methacrylate, ethoxylated trimethanolpropane methacrylate, ethoxylated di(trimethanol-propane)methacrylate, ethoxylated pentaerythritol methacrylate, ethoxylated dipentaerythritol methacrylate, ethoxylated neopentaglycol methacrylate, ethoxylated propylene glycol methacrylate, polyethylene glycol dimethacrylate, epoxy acrylate, polyether acrylate, polyester acrylate, polyurethane acrylate, polyol acrylates, propylene glycol acrylate, alkanediol acrylate, trimethylol propane acrylate, glycerolpropoxy acrylate, pentaerythritrol acrylate, neopentaglycol acrylate, N-vinyl amide, N-vinyl-formamide and N-vinyl-pyrrolidone, and combinations thereof. In some applications, the resin composition includes acrylate or methacrylate monomers or oligomers or combinations thereof.

2. Inert Resins

The high-stretch energy curable resin compositions provided herein can include one or more inert resins. Preferred inert resins are thermoplastic resins. Particularly preferred are thermoplastic resins having a Tg of 0 to 300° C., more preferably a Tg of at or about 20° C. to 100° C. or 25° C. to 75° C. In some applications, the monofunctional monomers/oligomers are selected to have a Tg of at or about room temperature (at or about 20° C. to 25° C.) or greater.

A non-limiting list of exemplary thermoplastic resin types include acrylic resins, urea aldehyde resins, polyester resins, aldehyde resins, epoxy resins, rosin ester resins, cellulose nitrate, cellulose acetobutyrate, vinyl chloride copolymers, melamine-formaldehyde resins, polyurethane resins, polyimide resins, alkyd resins, and phthalate resins, including aliphatic and aromatic types. Typical examples of the thermoplastic resin include synthetic rubber latex such as styrene-butadiene copolymer, acrylonitrile-butadiene copolymer, methyl methacrylate-butadiene copolymer, styrene-acrylonitrile-butadiene copolymer and styrene-methyl methacrylate-butadiene copolymer and modified versions thereof, such as amino-modified, polyether-modified, epoxy-modified, aliphatic acid-modified, carbonyl-modified and carboxy-modified resins, styrene-maleic anhydride copolymer, methyl vinyl ether-maleic anhydride copolymer, polyacrylic acid copolymer, polystyrene, styrene/acrylic acid ester copolymer, polyacrylic acid ester, polymethacrylic acid ester, acrylic acid ester/acrylic acid ester copolymer, and low-melting-point polyamide resin. A single type of thermoplastic resin can be used, or a combination of two or more types of thermoplastic resin can be included in the high stretch energy curable resin compositions. An exemplary urea aldehyde resin is Laropal® A81 from BASF, which is among the preferred thermoplastic resins.

When the resin compositions provided herein contain one or more inert resins, the inert resin can be present in an amount of at or about 10 wt % or greater based on the weight of the resin composition. In some applications, the amount of inert resin can be 10 wt % or less based on the weight of the resin composition. In some applications, the amount of inert resin can be between 10 wt % and 90 wt % based on the weight of the resin composition. In some applications, the amount of inert resin in the resin composition can be between 15 wt % and 85 wt %, or between 20 wt % and 80 wt %, or between 25 wt % and 75 wt %, or between 30 wt % and 70 wt %, or between 35 wt % and 65 wt %, or between 40 wt % and 60 wt %, or between 10 wt % and 50 wt %, or between 50 wt % and 95 wt %, or between 1 wt % and 10 wt %, based on the weight of the resin composition. In some applications, the amount of inert resin in the resin composition can be greater than 1 wt %, or greater than 5 wt %, or greater than 10 wt %, or greater than 15 wt %, or greater than 20 wt %, or greater than 25 wt %, or greater than 30 wt %, or greater than 35 wt %, or greater than 40 wt %, or greater than 45 wt %, or greater than 50 wt %, or greater than 55 wt %, or greater than 60 wt %, or greater than 65 wt %, or greater than 70 wt %, or greater than 75 wt %, or greater than 80 wt %, or greater than 85 wt %, or greater than 90 wt %, based on the total weight of the resin composition. In some applications, inert resin is present in an amount that is 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt %, 50 wt %, 50.5 wt %, 51 wt %, 51.5 wt %, 52 wt %, 52.5 wt %, 53 wt %, 53.5 wt %, 54 wt %, 54.5 wt %, 55 wt %, 55.5 wt %, 56 wt %, 56.5 wt %, 57 wt %, 57.5 wt %, 58 wt %, 58.5 wt %, 59 wt %, 59.5 wt %, 60 wt %, 60.5 wt %, 61 wt %, 61.5 wt %, 62 wt %, 62.5 wt %, 63 wt %, 63.5 wt %, 64 wt %, 64.5 wt %, 65 wt %, 65.5 wt %, 66 wt %, 66.5 wt %, 67 wt %, 67.5 wt %, 68 wt %, 68.5 wt %, 69 wt %, 69.5 wt %, 70 wt %, 70.5 wt %, 71 wt %, 71.5 wt %, 72 wt %, 72.5 wt %, 73 wt %, 73.5 wt %, 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt %, 80 wt %, 80.5 wt %, 81 wt %, 81.5 wt %, 82 wt %, 82.5 wt %, 83 wt %, 83.5 wt %, 84 wt %, 84.5 wt %, 85 wt %, 85.5 wt %, 86 wt %, 86.5 wt %, 87 wt %, 87.5 wt %, 88 wt %, 88.5 wt %, 89 wt %, 89.5 wt %, 90 wt %, 90.5 wt %, 91 wt %, 91.5 wt %, 92 wt %, 92.5 wt %, 93 wt %, 93.5 wt %, 94 wt %, 94.5 wt %, 95 wt %, 95.5 wt %, 96 wt %, 96.5 wt %, 97 wt %, 97.5 wt %, 98 wt %, 98.5 wt %, 99 wt % or 99.5 wt % by weight of the resin composition.

The ratio of inert resin, when present, to the monofunctional monomer/oligomer, can vary from 100:1 to 100:1, including all permutations therebetween. For example, the ratio of the amount of inert resin to monofunctional monomer/oligomer can be 1:1, 1:2, 1:3, 1:4, 1:5, 1:6, 1:7, 1:8, 1:9, 1:10, 1:20, 1:30, 1:40, 1:50, 1:60, 1:70, 1:80, 1:90, 90:1, 80:1, 70:1, 60:1, 50:1, 40:1, 30:1, 20:1, 10:1, 2:3, 5:7, 7:5, 3:2, 9:1. 8:1, 7:1, 6:1, 5:1, 4:1, 3:1 and 2:1.

In some applications, the amount of monofunctional monomers/oligomers in the resin composition is 60 wt % or greater and the amount of inert resin is 40 wt % or less. In some applications, the amount of monofunctional monomers/oligomers in the resin composition is 70 wt % or greater and the amount of inert resin is 20 wt % or less. In some applications, the amount of monofunctional monomers/oligomers in the resin composition is 80 wt % or greater and the amount of inert resin is 20 wt % or less. In some applications, the amount of monofunctional monomers/oligomers in the resin composition is 85 wt % or greater and the amount of inert resin is 15 wt % or less. In some applications, the amount of monofunctional monomers/oligomers in the resin composition is 90 wt % or greater and the amount of inert resin is 10 wt % or less. In some applications, the amount of monofunctional monomers/oligomers in the resin composition is 95 wt % or greater and the amount of inert resin is 5 wt % or less based on the total weight of the resin composition.

In some applications, the amount of monofunctional monomers/oligomers in the resin composition is 40 wt % or less and the amount of inert resin is 60 wt % or greater. In some applications, the amount of inert resin in the resin composition is 70 wt % or greater and the amount of monofunctional monomers/oligomers is 20 wt % or less. In some applications, the amount of inert resin in the resin composition is 80 wt % or greater and the amount of monofunctional monomers/oligomers is 20 wt % or less. In some applications, the amount of inert resin in the resin composition is 85 wt % or greater and the amount of monofunctional monomers/oligomers is 15 wt % or less. In some applications, the amount of inert resin in the resin composition is 90 wt % or greater and the amount of monofunctional monomers/oligomers is 10 wt % or less. The inert resin can be dissolved or solvated by the monofunctional monomers/oligomers. In some applications, the resin composition includes 80% or greater of a solution comprising inert resin dissolved or solvated in monofunctional monomers/oligomers.

3. Multifunctional Monomers/Oligomers

The resin composition of the present application can contain multifunctional monomers/oligomers in combination with the blend containing inert resins and monofunctional monomers/oligomers, such as a resin blend including a solution containing 80 wt % or greater of monofunctional monomers or monofunctional oligomers or inert thermoplastic resins or a combination thereof, e.g., acrylate and/or methacrylate monomers and/or oligomers and/or inert thermoplastic resins. Ink compositions of the present application that include the resin composition of the present application when cured are capable of being stretched 25% or more without any visual cracking at varied color densities and at single or multiple layers. Ink compositions of the present application will preferably include a resin composition as described above containing <20%, more preferably <10%, more preferably <5%, most preferably 0% multifunctional monomers/oligomers. Commercially available heat transfer inks contain a high percentage (25% or more) multifunctional monomers/oligomers in order to achieve fast cure speeds. As the amount of multi-functional monomers/oligomers increases, the amount of expected crosslinking increases. The increase in cross-linking enhances surface resistance properties (increases scratch and water resistance as well as solvent resistance) but also decreases flexibility and stretchability. If difunctional and multifunctional monomers/oligomers, e.g., di-, tri-, tetra- or higher acrylate and/or methacrylate monomers/oligomers, are included in the resin composition, for example, to improve crosslink density and/or resistance properties, the multifunctional monomers/oligomers preferably are included in amounts <20 wt %, more preferably <10 wt % or <5 wt %, and particularly 0 wt %, based on the weight of the resin composition. In some applications, the amount of multifunctional monomers/oligomers present in the resin composition is 0%, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.25 wt %, 1.5 wt %, 1.75 wt %, 2 wt %, 2.25 wt %, 2.5 wt %, 2.75 wt %, 3 wt %, 3.25 wt %, 3.5 wt %, 3.75 wt %, 4 wt %, 4.25 wt %, 4.5 wt %, 4.75 wt %, 5%, 5.25 wt %, 5.5%, 5.75 wt %, 6 wt %, 6.25 wt %, 6.5 wt %, 6.75 wt %, 7 wt %, 7.25 wt %, 7.5 wt %, 7.75 wt %, 8 wt %, 8.25 wt %, 8.5 wt %, 8.75 wt %, 9 wt %, 9.25 wt %, 9.5 wt %, 9.75 wt %, 10 wt %, 11 wt %, 11.25 wt %, 11.5 wt %, 11.75 wt %, 12 wt %, 12.25 wt %, 12.5 wt %, 12.75 wt %, 13 wt %, 13.25 wt %, 13.5 wt %, 13.75 wt %, 14 wt %, 14.25 wt %, 14.5 wt %, 14.75 wt %, 15%, 15.25 wt %, 15.5%, 15.75 wt %, 16 wt %, 16.25 wt %, 16.5 wt %, 16.75 wt %, 17 wt %, 17.25 wt %, 17.5 wt %, 17.75 wt %, 18 wt %, 18.25 wt %, 18.5 wt %, 18.75 wt %, 19 wt %, 19.25 wt %, 19.5 wt %, 19.75 wt % or 20 wt %, based on the weight of the resin composition.

In some applications, the multifunctional monomer/oligomer is difunctional. Examples of difunctional monomer/oligomer that can be included in the resin composition include alkoxylated aliphatic diacrylate, alkoxylated aliphatic dimethacrylate, alkoxylated neopentyl glycol diacrylate, alkoxylated neopentyl glycol dimethacrylate, 1,4-butanediol diacrylate, 1,4-butanediol dimethacrylate, 1,3-butylene glycol diacrylate, 1,3-butylene glycol dimethacrylate, cyclohexane dimethanol diacrylate, cyclohexane dimethanol dimethacrylate, diethylene glycol diacrylate, diethylene glycol dimethacrylate, dipropylene glycol diacrylate, dipropylene glycol diamethcrylate, 1,12-dodecanediol dimethacrylate, ethoxylated bisphenol A dimethacrylate, ethoxylated (2) bisphenol A dimethacrylate, ethoxylated (3) bisphenol A diacrylate, ethoxylated (4) bisphenol A diacrylate, ethoxylated (4) bisphenol A dimethacrylate, ethoxylated(6) bisphenol A dimethacrylate, ethoxylated (8) bisphenol A dimethacrylate, ethoxylated (10) bisphenol A diacrylate, ethoxylated(10) bisphenol A dimethacrylate, ethoxylated (30) bisphenol A diacrylate, ethoxylated (30) bisphenol A dimethacrylate, ethylene glycol dimethacrylate, 1,6-hexanediol diacrylate, 1,6-hexanediol dimethacrylate, neopentyl glycol diacrylate, neopentyl glycol dimethacrylate, polyester diacrylate, polyethylene glycol (200) diacrylate, polyethylene glycol (400) diacrylate, polyethylene glycol (400) dimethacrylate, polyethylene glycol (600) diacrylate, polyethylene glycol (600) dimethacrylate, polyethylene glycol dimethacrylate, polypropylene glycol (400) dimethacrylate, propoxylated neopentyl glycol diacrylate, propoxylated neopentyl glycol dimethacrylate, propoxylated (2) neopentyl glycol diacrylate, tetraethylene glycol diacrylate, tetraethylene glycol dimethacrylate, tricyclodecane dimethanol diacrylate, triethylene glycol diacrylate, triethylene glycol dimethacrylate, tripropylene glycol diacrylate and tripropylene glycol dimethacrylate and combinations thereof.

In some applications, the multifunctional monomer/oligomer is trifunctional. Examples of trifunctional monomer/oligomer that can be included in the resin composition include ethoxylated (3) trimethylolpropane triacrylate, ethoxylated (3) trimethylolpropane trimethacrylate, ethoxylated (6) trimethylolpropane triacrylate, ethoxylated (9) trimethylolpropane triacrylate, ethoxylated (15) trimethylolpropane triacrylate, ethoxylated(20) trimethylolpropane triacrylate, pentaerythritol triacrylate, propoxylated (3) glyceryl triacrylate, propoxylated (3) glyceryl triacrylate, propoxylated (5.5) glyceryl triacrylate, propoxylated (3) trimethylolpropane triacrylate, propoxylated (6) trimethylolpropane triacrylate, trimethylolpropane triacrylate, trimethylolpropane trimethacrylate, tris-(2-hydroxyethyl)-isocyanurate triacrylate and tris-(2-hydroxy ethyl)-isocyanurate trimethacrylate and combinations thereof.

In some applications, the multifunctional monomer/oligomer is tetrafunctional or pentafunctional. Examples of tetrafunctional or pentafunctional monomer/oligomer that can be included in the resin composition include di-(trimethylolpropane)-tetraacrylate, ethoxylated (4) pentaerythritol tetraacrylate, dipentaerythritol pentaacrylate, pentaacrylate ester and pentaerythritol tetraacrylate and combinations thereof.

The ratio of different functionality monomers and oligomers can be optimized to achieve an optimized balance between stretchability and surface resistant properties that are required by some applications, such as for labels that are to be applied to detergent bottles, shampoo bottles or gasoline bottles B. Inks and Coatings Provided herein are high-stretch energy curable inks and coating. The inks and coatings demonstrate good printability, fast cure, and after curing stretch 25% or more without cracking when printed up to 5 layers with multi color traps with or without first down clear coating and with or without last down white. The energy curable inks and coatings can be used in heat-transfer label (HTL) applications, e.g., in actinic energy (e.g., UV/EB) curable offset inks in multi-layer HTL applications that require high stretch during the heat-transfer process. The energy curable inks and coatings provided herein, when cured to form cured inks and coatings, are resistant to abrasion, water, chemicals, and heat, and exhibit good flexibility and extensibility.

The high-stretch energy curable inks and coatings provided herein include a resin composition provided herein, optionally a pigment/dye and optionally any one or more of an inhibitor, a viscosity modifier, a photoinhibitor and an additive. For example, a non-white ink can contain 40 wt % to 70 wt % resin composition provided herein and 0.1 wt % to 30 wt % pigment/dye and optionally 0.1 wt % to 30 wt % viscosity modifier to adjust viscosity and/or modulate Tg. An exemplary ink formula is shown in Table 1.

TABLE 1

| Exemplary Non-White Ink Formula | |
| --- | --- |
| Material Type | % |
| Resin composition as described herein | 40-70% |
| Inhibitor | 0-3% |
| Viscosity modifier | 0-30% |
| Photoinitiator | 0-15% |
| Pigment/dye | 0.1-30% |
| Additives | 0-15% |

A white ink composition generally contains a higher amount of white pigment, e.g., to provide the coverage or density desired. Any white pigment known in the art can be included in the formulation. An exemplary white ink can contain 20 wt % to 50 wt % resin composition provided herein, 5 wt % to 60 wt % of a white pigment, and optionally 0.1 wt % to 30 wt % viscosity modifier to adjust viscosity. An exemplary white ink formula is shown in Table 2.

TABLE 2

Exemplary White Ink Formula

| Material Type | % |
| --- | --- |
| Resin solution in a monofunctional monomer | 20-50% |
| Inhibitor | 0-3% |
| Monofunctional monomer (to adjust viscosity) | 0-30% |
| Photoinitiators | 0-15% |
| White pigment (such as $TiO_2$) | 5-60% |
| Additives | 0-10% |

An exemplary clear coating can contain 60 wt % to 90 wt % resin composition provided herein, and optionally 0.1 wt % to 20 wt % viscosity modifier to adjust viscosity. An exemplary clear coating formula is shown in Table 3.

TABLE 3

Exemplary Clear Coating

| Material Type | % |
| --- | --- |
| Resin solution in a monofunctional monomer | 60-90 |
| Inhibitor | 0-3% |
| Monofunctional monomer (to adjust viscosity) | 0-20% |
| Photoinitiators | 0-12% |
| Additives | 0-15% |

1. Resin Composition in the Inks and Coatings

The high-stretch energy curable ink compositions provided herein generally include 40 wt % or more of the resin composition provided herein based on the total weight of the ink composition. For high-stretch energy curable white ink compositions, the amount of resin composition provided herein included in the ink generally is between 20 wt % and 50 wt % based on the weight of the ink composition. For high-stretch energy curable clear coating compositions, the amount of resin composition provided herein included in the ink generally is between 60 wt % and 90 wt % based on the weight of the ink composition. In some applications, the resin composition is selected so that, based on the weight of the resin, the amount of monofunctional monomers/oligomers in the resin composition is 70 wt % or greater and the amount of inert resin is 20 wt % or less; or the amount of monofunctional monomers and/or oligomers in the resin composition is 80 wt % or greater and the amount of inert resin is 20 wt % or less; or the amount of monofunctional monomers/oligomers in the resin composition is 85 wt % or greater and the amount of inert resin is 15 wt % or less; or the amount of monofunctional monomers/oligomers in the resin composition is 90 wt % or greater and the amount of inert resin is 10 wt % or less; or the amount of monofunctional monomers/oligomers in the resin composition is 95 wt % or greater and the amount of inert resin is 5 wt % or less based on the total weight of the resin composition. Colored and white ink compositions of the present application preferably include a resin composition as described above containing <20 wt %, more preferably <10 wt %, more preferably <5 wt %, most preferably 0 wt %, of multifunctional monomers and/or oligomers, based on the weight of the resin composition. In some applications the ink compositions and white ink compositions exclude multifunctional monomers/oligomers. Clear coating compositions of the present application preferably include a resin composition as described above containing up to 20 wt %, more preferably up to 10 wt %, and more preferably up to 5 wt % of multifunctional monomers/oligomers, based on the weight of the resin composition, and in some applications the clear coating compositions exclude multifunctional monomers/oligomers.

For non-white inks, the total amount of resin composition based on the weight of the ink can be from 30 wt % to 80 wt %, and generally is 30 wt % or greater, or 35 wt % or greater, or 40 wt % or greater, or 45 wt % or greater, or 50 wt % or greater, or 55 wt % or greater, or 60 wt % or greater, or 65 wt % or greater. In some applications, the total amount of resin composition based on the weight of the ink is in the range of at or about 40 wt % and 70 wt %, or between at or about 45 wt % and 65 wt %, or between at or about 50 wt % and 70 wt %. For some inks, the total amount of resin composition based on the weight of the ink is 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt %, 50 wt %, 50.5 wt %, 51 wt %, 51.5 wt %, 52 wt %, 52.5 wt %, 53 wt %, 53.5 wt %, 54 wt %, 54.5 wt %, 55 wt %, 55.5 wt %, 56 wt %, 56.5 wt %, 57 wt %, 57.5 wt %, 58 wt %, 58.5 wt %, 59 wt %, 59.5 wt %, 60 wt %, 60.5 wt %, 61 wt %, 61.5 wt %, 62 wt %, 62.5 wt %, 63 wt %, 63.5 wt %, 64 wt %, 64.5 wt %, 65 wt %, 65.5 wt %, 66 wt %, 66.5 wt %, 67 wt %, 67.5 wt %, 68 wt %, 68.5 wt %, 69 wt %, 69.5 wt %, 70 wt %, 70.5 wt %, 71 wt %, 71.5 wt %, 72 wt %, 72.5 wt %, 73 wt %, 73.5 wt %, 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt % or 80 wt %.

For white inks, the total amount of resin composition based on the weight of the ink generally is 20 wt % or greater, or 25 wt % or greater, or 30 wt % or greater, or 35 wt % or greater, or 40 wt % or greater, or 45 wt % or greater. In some applications, the total amount of resin composition based on the weight of the white ink is in the range of at or about 20 wt % and 50 wt %, or between at or about 25 wt % and 45 wt %, or between at or about 20 wt % and 40 wt % or between at or about 30 wt % and 50 wt %. For some white inks, the total amount of resin composition based on the weight of the ink is 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %, 30.5 wt %, 31 wt %, 31.5 wt %, 32 wt %, 32.5 wt %, 33 wt %, 33.5 wt %, 34 wt %, 34.5 wt %, 35 wt %, 35.5 wt %, 36 wt %, 36.5 wt %, 37 wt %, 37.5 wt %, 38 wt %, 38.5 wt %, 39 wt %, 39.5 wt %, 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt % or 50 wt %.

For clear coatings, the total amount of resin composition based on the weight of the ink generally is 60 wt % or greater, or 65 wt % or greater, or 70 wt % or greater, or 75 wt % or greater, or 70 wt % or greater, or 75 wt % or greater, or 80 wt % or greater, or 85 wt % or greater. In some applications, the total amount of resin composition based on the weight of the clear coating is between at or about 60 wt % and 90 wt %, or between at or about 60 wt % and 85 wt %, or between at or about 60 wt % and 80 wt %, or between at or about 60 wt % and 75 wt %, or between at or about 75 wt % and 90 wt %, or between at or about 80 wt % and 90 wt %. For some clear coatings, the total amount of resin composition based on the weight of the clear coating is 60 wt %, 60.5 wt %, 61 wt %, 61.5 wt %, 62 wt %, 62.5 wt %, 63 wt %, 63.5 wt %, 64 wt %, 64.5 wt %, 65 wt %, 65.5 wt %, 66 wt %, 66.5 wt %, 67 wt %, 67.5 wt %, 68 wt %, 68.5 wt %, 69 wt %, 69.5 wt %, 70 wt %, 70.5 wt %, 71 wt %, 71.5 wt %, 72 wt %, 72.5 wt %, 73 wt %, 73.5 wt %, 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt %, 80 wt %, 80.5 wt %, 81 wt %, 81.5 wt %, 82 wt %, 82.5 wt %, 83 wt %, 83.5 wt %, 84 wt %, 84.5 wt %, 85 wt %, 85.5 wt %, 86 wt %, 86.5 wt %, 87 wt %, 87.5 wt %, 88 wt %, 88.5 wt %, 89 wt %, 89.5 wt % and 90 wt %.

2. Viscosity Modifier

The high-stretch energy curable ink, white ink and clear coating compositions provided herein can include a viscosity modifier to modulate the final viscosity of the ink formulation. Any viscosity modifier known and used in the art of heat transfer labels and inks can be included in the ink and coating formulations provided herein. Examples of viscosity modifiers that can be included in the inks and coatings provided herein include acrylate esters, acrylic esters, acrylic monomer, aliphatic mono acrylate, aliphatic mono methacrylate, alkoxylated lauryl acrylate, alkoxylated phenol acrylate, alkoxylated tetrahydrofurfuryl acrylate, $C_{12}$-$C_{14}$ alkyl methacrylate, aromatic acrylate monomer, aromatic methacrylate monomer, caprolactone acrylate, cyclic trimethylol-propane formal acrylate, cycloaliphatic acrylate monomer, dicyclopentadienyl methacrylate, diethylene glycol methyl ether methacrylate, epoxidized soybean fatty acid esters, epoxidized linseed fatty acid esters, epoxy acrylate, epoxy(meth)acrylate, 2-(2-ethoxy-ethoxy)ethyl acrylate, ethoxylated (4) nonyl phenol acrylate, ethoxylated (4) nonyl phenol methacrylate, ethoxylated nonyl phenol acrylate, hydroxy-terminated epoxidized 1,3-polybutadiene, isobornyl acrylate, isobornyl methacrylate, isodecyl acrylate, isodecyl methacrylate, isooctyl acrylate, isooctyl methacrylate, lauryl acrylate, lauryl methacrylate, methoxy polyethylene glycol (350) monoacrylate, methoxy polyethylene glycol (350) monomethacrylate, methoxy poly-ethylene glycol (550) monoacrylate, methoxy polyethylene glycol (550) mono-methacrylate, nonyl-phenyl polyoxyethylene acrylate, octyldecyl acrylate, 2-phenoxyethyl acrylate, 2-phenoxyethyl methacrylate, polybutadiene polymer, polyester acrylate, polyester methacrylate, polyether acrylate, polyether methacrylate, stearyl acrylate, stearyl methacrylate, tetrahydrofurfuryl acrylate, tetrahydrofurfuryl methacrylate, triethylene glycol ethyl ether methacrylate, 3,3,5-trimethylcyclohexyl methacrylate, urethane acrylate and urethane methacrylate and combinations thereof.

A monomer can be used to decrease the viscosity of an oligomer. For example, the viscosity modifier in the inks or coatings provided herein can be a monofunctional monomer or monofunctional oligomer as described herein as part of the resin composition or a thermoplastic resin as described herein as part of the resin composition or a combination of a monofunctional monomer/oligomer and a thermoplastic resin. In some applications, the viscosity modifier can be the same monofunctional monomer or monofunctional oligomer that is present in the resin composition. In some applications, the viscosity modifier can be the same inert resin or inert thermoplastic resin that is present in the resin composition. In some applications, the viscosity modifier is not the same monofunctional monomer or monofunctional oligomer as is present in the resin composition. In some applications, the viscosity modifier is not the same inert resin or inert thermoplastic resin as is present in the resin composition.

The amount of viscosity modifier in the colored or white ink or coating, e.g., clear coating, can vary depending on the type of process used to apply the ink or coating. The viscosity ranges for the various forms of non-contact printing, including but not limited to, continuous and drop-on-demand ink jet, and for suitable forms of contact printing, including, but not limited to, gravure and lithographic printing and flexography, are well known to those skilled in the art of printing. For example, see *The Printing Ink Manual* (5th ed., Leach et al. eds. (2009), pages 549-551 and 554-555 for flexographic printing; pages 485-489 for gravure printing; pages 682, 683, 696 and 697 for inkjet printing; pages 348 and 381 for lithographic printing).

For example, inks used with lithographic (e.g., offset) printing typically need to have a viscosity of at least at or about 4,500 cP (Brookfield HBDV-E viscometer at 25° C.), and the viscosity can be in the range of 5,000 cP to 15,000 cP, and in some applications, can have a viscosity in the range of 6,000 cP to 12,000 cP, and in some applications, can have a viscosity of at least about 10,000 cP, or at least about 14,000 cP. Inks formulated for flexographic printing generally have a lower viscosity, typically a viscosity of at less than about 2,000 cP, and in some applications can be formulated to have a viscosity of less than at or about 1,000 cP or less than at or about 500 cP Inks formulated for gravure printing generally are formulated to have a viscosity between 15 and 25 seconds (Zahn Cup No. 2 at 25° C.).

Thus, for a given ink or coating containing a resin (which includes a mixture of monofunctional monomer/oligomer, inert resin and 0-20% multifunctional monomer or oligomer) and other components (e.g., pigment/dye, photoinitiator, additives, discussed below), a greater amount of viscosity modifier may be needed for flexographic, gravure and other types of printing (to reduce the viscosity), while less viscosity modifier may be needed for lithographic (e.g., offset) printing.

The amount of viscosity modifier that can be included in the ink formulations can vary depending on the type of process used to apply the ink. In some applications, the amount of viscosity modifier based on the weight of the ink composition is between at or about 0.1 wt % to at or about 30 wt %. In some applications, the amount of viscosity modifier based on the weight of the ink composition is in the range of 1 wt % to 25 wt %, or 5 wt % to 20 wt %, or 5 wt % to 15 wt %, or 0.1 wt % to 10 wt %, or o.5 wt % to 5 wt %. In some applications, the amount of viscosity modifier present in the ink is 0.1%, 0.2 wt %, 0.3 wt %, 0.4 wt %, 0.5 wt %, 0.6 wt %, 0.7 wt %, 0.8 wt %, 0.9 wt %, 1 wt %, 1.25 wt %, 1.5 wt %, 1.75 wt %, 2 wt %, 2.25 wt %, 2.5 wt %, 2.75 wt %, 3 wt %, 3.25 wt %, 3.5 wt %, 3.75 wt %, 4 wt %, 4.25 wt %, 4.5 wt %, 4.75 wt %, 5%, 5.25 wt %, 5.5%, 5.75 wt %, 6 wt %, 6.25 wt %, 6.5 wt %, 6.75 wt %, 7 wt %, 7.25 wt %, 7.5 wt %, 7.75 wt %, 8 wt %, 8.25 wt %, 8.5 wt %, 8.75 wt %, 9 wt %, 9.25 wt %, 9.5 wt %, 9.75 wt %, 10 wt %, 11 wt %, 11.25 wt %, 11.5 wt %, 11.75 wt %, 12 wt %, 12.25 wt %, 12.5 wt %, 12.75 wt %, 13 wt %, 13.25 wt %, 13.5 wt %, 13.75 wt %, 14 wt %, 14.25 wt %, 14.5 wt %, 14.75 wt %, 15%, 15.25 wt %, 15.5%, 15.75 wt %, 16 wt %, 16.25 wt %, 16.5 wt %, 16.75 wt %, 17 wt %, 17.25 wt %, 17.5 wt %, 17.75 wt %, 18 wt %, 18.25 wt %, 18.5 wt %, 18.75 wt %, 19 wt %, 19.25 wt %, 19.5 wt %, 19.75 wt % , 20 wt %, 21.25 wt %, 21.5 wt %, 21.75 wt %, 22 wt %, 22.25 wt %, 22.5 wt %, 22.75 wt %, 23 wt %, 23.25 wt %, 23.5 wt %, 23.75 wt %, 24 wt %, 24.25 wt %, 24.5 wt %, 24.75 wt %, 25%, 25.25 wt %, 25.5%, 25.75 wt %, 26 wt %, 26.25 wt %, 26.5 wt %, 26.75 wt %, 27 wt %, 27.25 wt %, 27.5 wt %, 27.75 wt %, 28 wt %, 28.25 wt %, 28.5 wt %, 28.75 wt %, 29 wt %, 29.25 wt %, 29.5 wt %, 29.75 wt % or 30 wt %, based on the weight of the ink composition.

The Tg or viscosity or both of the inert resin can be modulated by the presence of monofunctional monomers/oligomers. For example, one or more or a combination of monofunctional monomers/oligomers can be used as a viscosity modifying agent to reduce the apparent viscosity of the resin compositions provided herein containing a high viscosity inert resin. As the amount of monofunctional monomers/oligomers in the resin composition increases, the apparent viscosity of the resin composition decreases. Similarly, including monofunctional monomers/oligomers in the resin composition can result in an observed decrease in Tg of an otherwise unworkable inert resin due to its high Tg when not in the presence of monofunctional monomers/oligomers.

3. Photoinitiator

The high-stretch energy curable inks of the present application can contain one or more photoinitiators. Examples of photoinitiators that can be included in the ink compositions include, but are not limited to, benzoin ethers, such as benzoin methyl ether, benzoin ethyl ether, and benzoin phenyl ether; alkylbenzoins, such as methylbenzoin, ethylbenzoin, propylbenzoin, butylbenzoin and pentylbenzoin; benzyl derivatives, such as benzyl-dimethylketal; 2,4,5-triaryl-imidazole dimers, such as 2-(o-chlorophenyl)-4,5-diphenylimidazole dimer, 2-(o-chloro-phenyl)-4,5-di(m-methoxyphenyl)imidazole dimer, 2-(o-fluorophenyl)-4,5-phenyl-imidazole dimer, 2-(o-methoxyphenyl)-4,5-diphenyl-imidazole dimer, 2-(p-methoxy-phenyl)-4,5-diphenylimidazole dimer, 2,4-di(p-methoxy-phenyl)-5-phenyl-imidazole dimer and 2-(2,4-dimethoxyphenyl)-4,5-diphenyl-imidazole dimer; acridine derivatives such as 9-phenylacridine and 1,7-bis(9,9'-aridinyl)heptane; N-phenylglycine; benzophenones, anthraquinones, thioxanthones and derivatives thereof, including chloro-benzophenone, 4-phenylbenzophenone, trimethyl-benzophenone, 3,3'-dimethyl-4-methoxybenzophenone, 4,4'-dimethylamino-benzophenone, 4,4'-bis(diethyl-amino)-benzophenone, acrylated benzophenone, methyl-o-benzoyl benzoate, isopropyl-thioxanthone, 2-chloro and 2-ethyl-thioxanthone, 2-benzyl-2-(dimethyl-amino)-4'-morpholino-butyrophenone and hydroxy benzophenone; acetophenone derivatives including 2,2-dimethoxy-2-phenyl-acetophenone, 2,2-diethoxyacetophenone, 2,2-dimethoxy-2-phenylacetophene and 1-hydroxycyclohexylacetophenone; 2-hydroxy-2-methyl-1-phenylpropanone; 4-benzoyl-4'-methyl-diphenyl sulfide; ethyl 4-dimethyl-amino-benzoate; 2-ethyl-hydroquinone; (2,4,6-trimethylbenzoyl)diphenyl phosphine oxide (Lucerin TPO, available from BASF, Munich, Germany); ethyl(2,4,6-trimethyl-benzoyl-phenyl phosphinate; α-hydroxy ketone photoinitiators, such as 1-hydroxy-cyclohexyl-phenyl ketone (e.g., Irgacure® 184 available from Ciba Specialty Chemical (Hawthorne, N.Y.), 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone, 2-hydroxy-2-methyl-1-phenylpropanone and 2-hydroxy-2-methyl-1-[(2-hydroxyethoxy)-phenyl]propanone; (2,6-dimethoxy-benzoyl)-2,4,4-trimethylpentyl phosphine oxide (e.g., commercial blends Irgacure® 1800, 1850, and 1700 available from Ciba Specialty Chemical); 2,2-dimethoxyl-2-phenyl acetophenone (e.g., Irgacure® 651, available from Ciba Specialty Chemical); bisacylphosphine oxide photoinitiators, such as bis(2,4,6-trimethylbenzoyl)phenyl-phosphine oxide (e.g., Irgacure® 819 from Ciba Specialty Chemical), bis(2,6-dimethoxybenzoyl)-isooctyl-phosphine oxide and ethoxy(2,4,6-trimethyl-benzoyl)phenyl phosphine oxide (Lucerin® TPO-L from BASF), and combinations thereof.

The amount of photoinitiator present in the ink generally is 15 wt % or less based on the weight of the ink composition. In some applications, the amount of photoinitiator present in the ink generally is 10 wt % or less, or 5 wt % or less, based on the weight of the ink composition. In some applications, the amount of photoinitiator present in the ink is 0.1%, 0.2 wt %, 0.3 wt %, 0.4 wt %, 0.5 wt %, 0.6 wt %, 0.7 wt %, 0.8 wt %, 0.9 wt %, 1 wt %, 1.25 wt %, 1.5 wt %, 1.75 wt %, 2 wt %, 2.25 wt %, 2.5 wt %, 2.75 wt %, 3 wt %, 3.25 wt %, 3.5 wt %, 3.75 wt %, 4 wt %, 4.25 wt %, 4.5 wt %, 4.75 wt %, 5%, 5.25 wt %, 5.5%, 5.75 wt %, 6 wt %, 6.25 wt %, 6.5 wt %, 6.75 wt %, 7 wt %, 7.25 wt %, 7.5 wt %, 7.75 wt %, 8 wt %, 8.25 wt %, 8.5 wt %, 8.75 wt %, 9 wt %, 9.25 wt %, 9.5 wt %, 9.75 wt %, 10 wt %, 11 wt %, 11.25 wt %, 11.5 wt %, 11.75 wt %, 12 wt %, 12.25 wt %, 12.5 wt %, 12.75 wt %, 13 wt %, 13.25 wt %, 13.5 wt %, 13.75 wt %, 14 wt %, 14.25 wt %, 14.5 wt %, 14.75 wt % or 15%.

4. Pigment/Dye

The high-stretch energy curable inks and coatings provided herein can include a colorant, such as a pigment or dye or combination thereof. Any organic and/or inorganic pigments and dyes can be included in the inks Exemplary pigments suitable for use in the present invention include International Color Index or C.I. Pigment Black Numbers 1, 7, 11 and 31, C.I. Pigment Blue Numbers 15, 15:1, 15:2, 15:3, 15:4, 15:6, 16, 27, 29, 61 and 62, C.I. Pigment Green Numbers 7, 17, 18 and 36, C.I. Pigment Orange Numbers 5, 13, 16, 34 and 36, C.I. Pigment Violet Numbers 3, 19, 23 and 27, C.I. Pigment Red Numbers 3, 17, 22, 23, 48:1, 48:2, 57:1, 81:1, 81:2, 81:3, 81:5, 101, 114, 122, 144, 146, 170, 176, 179, 181, 185, 188, 202, 206, 207, 210 and 249, C.I. Pigment Yellow Numbers 1, 2, 3, 12, 13, 14, 17, 42, 65, 73, 74, 75, 83, 93, 109, 110, 128, 138, 139, 147, 142, 151, 154 and 180, D&C Red No. 7, D&C Red No. 6 and D&C Red No. 34, carbon black pigment (such as Regal 330, Cabot Corporation), quinacridone pigments (Quinacridone Magenta (228-0122), available from Sun Chemical Corporation, Fort Lee, N.J.), diarylide yellow pigment (such as AAOT Yellow (274-1788) available from Sun Chemical Corporation); and phthalocyanine blue pigment (such as Blue 15:3 (294-1298) available from Sun Chemical Corporation).

The classes of dyes suitable for use in present invention can be selected from acid dyes, natural dyes, direct dyes (either cationic or anionic), basic dyes, and reactive dyes. The acid dyes, also regarded as anionic dyes, are soluble in water and mainly insoluble in organic solvents and are selected, from yellow acid dyes, orange acid dyes, red acid dyes, violet acid dyes, blue acid dyes, green acid dyes, and black acid dyes. European Patent 0745651, incorporated herein by reference, describes a number of acid dyes that are suitable for use in the present invention. Exemplary yellow acid dyes include Acid Yellow 1 International Color Index or C.I. 10316); Acid Yellow 7 (C.I. 56295); Acid Yellow 17 (C.I. 18965); Acid Yellow 23 (C.I. 19140); Acid Yellow 29 (C.I. 18900); Acid Yellow 36 (C.I. 13065); Acid Yellow 42 (C.I. 22910); Acid Yellow 73 (C.I. 45350); Acid Yellow 99 (C.I. 13908); Acid Yellow 194; and Food Yellow 3 (C.I. 15985). Exemplary orange acid dyes include Acid Orange 1 (C.I. 13090/1); Acid Orange 10 (C.I. 16230); Acid Orange 20 (C.I. 14603); Acid Orange 76 (C.I. 18870); Acid Orange 142; Food Orange 2 (C.I. 15980); and Orange B. Exemplary red acid dyes include Acid Red 1. (C.I. 18050); Acid Red 4 (C.I. 14710); Acid Red 18 (C.I. 16255), Acid Red 26 (C.I. 16150); Acid Red 2.7 (C.I. as Acid Red 51 (C.I. 45430, available from BASF Corporation, Mt. Olive, N.J.) Acid Red 52 (C.I. 45100); Acid Red 73 (C.I. 27290); Acid Red 87 (C. I. 45380); Acid Red 94 (C.I. 45440) Acid Red 194; and Food Red 1 (C.I. 14700).

Exemplary violet acid dyes include Acid Violet 7 (C.I. 18055); and Acid Violet 49 (C.I. 42640). Exemplary blue acid dyes include Acid Blue 1 (C.I. 42045); Acid Blue 9 (C.I. 42090); Acid Blue 22 (C.I. 42755); Acid Blue 74 (C.I. 73015); Acid Blue 93 (C.I. 42780); and Acid Blue 158A (C.I. 15050). Exemplary green acid dyes include Acid Green 1 (C.I. 10028); Acid Green 3 (C.I. 42085); Acid Green 5 (C.I. 42095); Acid Green 26 (C.I. 44025); and Food Green 3 (C.I. 42053). Exemplary black acid dyes include Acid Black 1 (C.I. 20470); Acid Black 194 (Basantol® X80, available from BASF Corporation, an azo/1:2 CR-complex.

Exemplary direct dyes for use in the present invention include Direct Blue 86 (C.I. 74180); Direct Blue 199; Direct Black 168; Direct Red 253; and Direct Yellow 107/132 (C.I. Not Assigned).

Exemplary natural dyes for use in the present invention include Alkanet (C.I. 75520,75530); Annafto (C.I. 75120); Carotene (C.I. 75130); Chestnut; Cochineal (C.I. 75470); Cutch (C.I. 75250, 75260); Divi-Divi; Fustic (C.I. 75240); Hypernic (C.I. 75280); Logwood (C.I. 75200); Osage Orange (C.I. 75660); Paprika; Quercitron (C.I. 75720); Sanrou (C.I. 75100); Sandal Wood (C.I. 75510, 75540, 75550, 75560); Sumac; and Tumeric (C.I. 75300). Exemplary reactive dyes for use in the present invention include Reactive Yellow 37 (monoazo dye); Reactive Black 31 (disazo dye); Reactive Blue 77 (phthalo cyanine dye) and Reactive Red 180 and Reactive Red 108 dyes. Suitable also are the colorants described in The Printing Ink Manual (5th ed., Leach et al. eds. (2007), pages 289-299. Other organic and inorganic pigments and dyes and combinations thereof can be used to achieve the colors desired.

In addition to or in place of visible colorants, the high stretch inks and coatings provided herein composition can contain UV fluorophores that are excited in the UV range and emit light at a higher wavelength (typically 400nm and above). Examples of UV fluorophores include but are not limited to materials from the coumarin, benzoxazole, rhodamine, napthalimide, perylene, benzanthrones, benzoxanthones or benzothia-xanthones families. The addition of a UV fluorophore (such as an optical brightener for instance) can help maintain maximum visible light transmission. The amount of colorant, when present, generally is between 0.05% to 5% or between 0.1% and 1% based on the weight of the ink or coating composition.

For non-white inks, the amount of pigment/dye generally is present in an amount of from at or about 0.1 wt % to at or about 20 wt % based on the weight of the ink composition. In some applications, a non-white ink can include 15 wt % or less pigment/dye, or 10 wt % or less pigment/dye or 5 wt % pigment/dye, or 1 wt % pigment/dye based on the weight of the ink composition. In some applications, a non-white ink can include 1 wt % to 10 wt %, or 5 wt % to 15 wt %, or 10 wt % to 20 wt % pigment/dye based on the weight of the ink composition. In some applications, a non-white ink can contain an amount of dye/pigment that is 1 wt %, 2 wt %, 3 wt %, 4 wt %, 5%, 6 wt %, 7 wt %, 8 wt %, 9 wt %, 10 wt %, 11 wt %, 12 wt %, 13 wt %, 14 wt %, 15%, 16 wt %, 17 wt %, 18 wt %, 19 wt % or 20 wt % based on the weight of the ink composition.

For white ink compositions, the amount of white pigment generally is present in an amount of from at or about 1 wt % to at or about 60 wt % based on the weight of the ink composition. In some applications, greater than 60 wt % white pigment can be present. Preferred white pigments include titanium dioxide (anatase and rutile), zinc oxide, lithopone (calcined coprecipitate of barium sulfate and zinc sulfide), zinc sulfide, blanc fixe and alumina hydrate and combinations thereof, although any of these can be combined with calcium carbonate. In some applications, a white ink can include 60 wt % or less white pigment, or 55 wt % or less white pigment, or 50 wt % white pigment, or 45 wt % white pigment, or 40 wt % white pigment, or 35 wt % white pigment, or 30 wt % white pigment, or 25 wt % white pigment, or 20 wt % white pigment, or 15 wt % white pigment, or 10 wt % white pigment, based on the weight of the ink composition. In some applications, a white ink can include 5 wt % to 60 wt %, or 5 wt % to 55 wt %, or 10 wt % to 50 wt %, or 10 wt % to 25 wt %, or 25 wt % to 50 wt %, or 5 wt % to 15 wt %, or 40 wt % to 60 wt % white pigment based on the weight of the ink composition. In some applications, a non-white ink can an amount of dye/pigment that is 5%, 6 wt %, 7 wt %, 8 wt %, 9 wt %, 10 wt %, 11 wt %, 12 wt %, 13 wt %, 14 wt %, 15%, 16 wt %, 17 wt %, 18 wt %, 19 wt %, 20 wt %, 21 wt %, 22 wt %, 23 wt %, 24 wt %, 25%, 26 wt %, 27 wt %, 28 wt %, 29 wt %, 30 wt %, 31 wt %, 32 wt %, 33 wt %, 34 wt %, 35%, 36 wt %, 37 wt %, 38 wt %, 39 wt %, 40 wt %, 41 wt %, 42 wt %, 43 wt %, 44 wt %, 45%, 46 wt %, 47 wt %, 48 wt %, 49 wt %, 50 wt %, 51 wt %, 52 wt %, 53 wt %, 54 wt %, 55%, 56 wt %, 57 wt %, 58 wt %, 59 wt % or 60 wt % based on the weight of the ink composition.

For clear coatings, colorants such as optical brighteners can be included. In some applications, no colorant, pigment or dye is included in the clear coatings. When present, the amount of colorant, pigment or dye generally is 10 wt % or less based on the weight of the ink composition.

5. Additives

The ink, white ink and clear coating compositions can include one or more of various additives, such as, e.g., ammonia, anti-misting agents (e.g., silica and microtalc), clay, defoamers, dispersants, flow agents, inhibitors, lubricants (e.g., wax), plasticizers, silicones, stabilizers, talc, wetting agents, or any combination thereof. Each of these additives can be used in an ink or coating of this disclosure at a level of from about 0.001% to about 10% or more based on the weight of the ink composition.

Wetting agents can be included in the inks or coatings, e.g., to modify surface tension. Exemplary wetting agents include polyether modified polydimethylsiloxane (BYK® 307), xylene, ethylbenzene, a blend of xylene and ethylbenzene (BYK® 310), octamethylcyclo-tetrasiloxane (BYK® 331) and alcohol alkoxylates (e.g., BYK® DYNWET).

Any foam destroying or foam mitigating polymer or compound can be included in the inks as a defoamer. Examples of these include polysiloxanes, oxyalkylene amines, silicone oils and fluids, polyacrylates, polyglycol, polyols, and polyether modified methylalkyl polysiloxane copolymers and combinations thereof.

In some applications, the inks or coatings can include one or more polymerization inhibitors or stabilizers for radically curable inks or both. Examples of these include benzoquinone, benzotriazolealuminium salt amine complexes, butylated hydroxytoluene, hydroquinone, hydroquinone monomethyl ether, Florstab® UV-1 (Kromachem LTD), Genorad® 16 inhibitor compound (Rahn Corporation), Irgastab® UV-10 and Irgastab® UV-22 (Ciba Specialty Chemicals Inc.), naphthoquinone, t-butylcatechol, t-butylhydroquinone and combinations thereof.

The inks or coatings can a flow agent. Examples of flow agents that can be included in the inks or coatings include, e.g., butyrates, celluloses, polyacrylates, surfactants, silicones and waxes. Examples of surfactants include siloxanes, polyalkyleneoxide siloxanes, polyalkyleneoxide polydimethylsiloxanes, polyester polydimethylsiloxanes, ethoxylated nonylphenols, nonylphenoxy polyethyleneoxyethanol, fluorocarbon esters, fluoroaliphatic polymeric esters, fluorinated esters, alkylphenoxy alkyleneoxides, cetyl trimethyl ammonium chloride, carboxymethylamylose, ethoxylated acetylene glycols, betaines, N-dodecyl-N,N-dimethyl-betaine, dialkyl sulfosuccinate salts, alkylnaphthalene-sulfonate salts, fatty acid salts, polyoxyethylene alkylethers, polyoxyethylene alkylallyl-ethers, polyoxyethylenepolyoxypropylene block copolymers, alkylamine salts, quaternary ammonium salts, and mixtures thereof.

The inks or coatings can include a plasticizer. Examples of plasticizers include alkyl benzyl phthalates, butyl benzyl phthalates, di-2-ethylhexy-adipates, diethyl phthalates, dimethyl phthalates, dioctyl phthalates, diisobutyl phthalates, dicyclohexyl phthalates, diisobutyl adipates, glycerol tribenzoates, polypropylene glycol dibenzoates, neopentyl glycol dibenzoates, dimethyl isophthalates, dibutyl phthalates, dibutyl sebacates, sucrose benzoates, tri-n-hexyltrimellitates, and mixtures thereof. The inks or coatings can include one or more dispersant. Examples of a dispersant include acrylic block copolymers, acrylate block copolymers, graft polymers, hydrophilic-hydrophobic block copolymers, a polymer dispersant, a surfactant, and mixtures thereof.

C. Stretchability

As discussed above, the high-stretch energy curable inks and coatings provided herein when cured to form cured inks and cured coatings, exhibit a stretchability, such as when at least a part of a heat transfer label is stretched at least about 10%, e.g., from about 10% to about 30%, or from 15% to 25%, or 25% or more, without visually cracking. The cured inks or coatings can be stretched in any or all directions, and generally stretched in at least one direction. In some applications, the cured high-stretch energy curable inks and coatings provided herein exhibit a stretchability without cracking of 15%, 16%, 17%, 18%, 19%, 20%, 21%, 22%, 23%, 24%, 25%, 26%, 27%, 28% 29% or 30% or more. By virtue of this high stretchability of the inks and coatings provided herein, heat transfer labels containing the high-stretch energy curable inks and coating provided herein can be applied to containers that are tapered or contoured without cracking of the label or decoration. Commercially available UV curable coatings and inks typically stretch only about 1-3% before cracking, and are not suitable for modern containers that include non-cylindrical shapes or contours. Such inks often contain high strength materials that are brittle or are crosslinked to such an extent to provide strength that they are not sufficiently elastic to elongate. The cured high-stretch energy curable inks and coatings provided herein exhibit high elongation without cracking and are well suited for modern non-cylindrical or contoured containers. The high-stretch energy curable inks and coatings provided herein also can be used in applications requiring no stretch, such as when the heat transfer label is to be applied to a perfectly cylindrical container. The high-stretch energy curable inks and coatings provided when cured to form cured inks and cured coatings herein exhibit stretch of 25% or more without cracking during a heat label transfer process.

It will be appreciated that while the high-stretch energy curable inks and coating compositions and label and decorations containing the inks and coatings are described herein for use in heat transfer label applications, the ink and coating compositions provided herein also can be used in other applications.

D. Exemplary High Stretch Inks and Coatings

The high stretch inks and coatings provided herein can be clear or transparent or colorless or translucent or pearlescent or can include a pigment or dye or combination thereof to have a selected color. Provided are energy curable non-white inks that include at or about 0.1 wt % to at or about 20 wt % pigment/dye and at or about 40 wt % to at or about 70 wt % of a resin composition as described herein (e.g., that includes a multifunctional monomer or a multifunctional oligomer or both in an amount from 0% to at or about 20% based on the weight of the composition; and a combination that includes an inert resin and a monofunctional monomer or a monofunctional oligomer or both a monofunctional monomer and a monofunctional oligomer, where the combination is present in an amount that is 80% or more based on the weight of the composition). Also provided are cured non-white inks that include at or about 0.1 wt % to at or about 20 wt % pigment/dye and at or about 40 wt % to at or about 70 wt % of a resin composition as described herein, where the cured non-white ink exhibits stretch of 25% or more without cracking.

Also provided are energy curable clear coat that include at or about 60 wt % to at or about 90 wt % of a resin composition described herein based on the weight of the ink composition. Also provided are cured clear coat compositions that include at or about 60 wt % to at or about 90 wt % of a resin composition described herein based on the weight of the ink composition, where the cured clear coat exhibits stretch of 25% or more without cracking.

Also provided are energy curable white inks that include at or about 5 wt % to at or about 60 wt % white pigment/dye and at or about 20 wt % to at or about 50 wt % of a resin composition described herein based on the weight of the ink composition. Also provided are cured white inks that include at or about 5 wt % to at or about 60 wt % white pigment/dye and at or about 20 wt % to at or about 50 wt % of a resin composition described herein based on the weight of the ink composition, where the cured white ink when cured exhibits stretch of 25% or more without cracking.

E. Heat Transfer Label Applications

The inks of present application can be used to provide multilayer heat transfer labels. The multiple layer construction is not limited to any specific number of layers or order of application. In a preferred embodiment, the multilayer construct would contain (a) a first down clear coat; (b) 4-color process colors and/or spot colors; and (c) optionally a last down white. A layer of adhesive also can be included.

A heat transfer label for application to an article, such as a container, can include a carrier web, a release coat applied to the carrier web, and a label or decoration including a high-stretch energy curable ink provided herein applied to the carrier web, the ink being cured by application of actinic radiation, such as UV or EB, prior to transfer to the article.

In some applications, a heat transfer label can include a support portion, such as a carrier web or other support, and a transfer portion on the support portion for transfer of the transfer portion from the support portion to an article upon application of heat to the support portion while the transfer portion is placed into contact with the article, where the transfer portion includes one or more than one ink layers containing a high-stretch energy curable ink or coating provided herein and an adhesive layer over the outermost ink layer.

Also provided herein are thermoplastic heat transfer labels curable by exposure to actinic radiation, such as UV or EB radiation or a combinations thereof, for labeling or decorating a substrate, such as a container, upon application of heat and pressure while the label and substrate are in contact. The label can include one or more of the high-stretch energy-curable inks or coatings provided herein printed on a carrier, cured by exposure to actinic radiation, and the label is applied to the substrate. The inks and coatings provided herein can be applied to a substrate or carrier to form an ink label or decoration. The inks and/or coatings can be applied to the substrate or carrier using any suitable process, for example, by lithographic, flexographic or gravure printing. Different printing techniques or combinations thereof can be used to achieve the desired print quality and coat weight.

In some applications, the heat transfer label includes one or more of the high-stretch energy-curable inks or coatings provided herein and an adhesive. The heat transfer label also can include a release layer. In some applications, the heat transfer label can include a high-stretch energy-curable ink or coating provided herein, an adhesive, an image support and a protective layer. The protective layer can serve as a barrier over the label to protect it from the environment, such as from direct physical contact that could lead to abrasion of the label. In some applications, the release layer can serve as a protective layer for the ink label or decoration. The protective layer can be adhered directly to the ink layer on one surface and adhered directly to the image support on its opposite surface. Alternatively, a wax release layer can be present between the image support and the protective layer. The wax release layer can include one or a combination of waxes.

The protective layer when present can have a thickness of at or about 0.5 to 50 microns, such as from 1 to 10 microns. The protective layer can include a water-based or solvent-based resin to provide abrasion resistance to the underlying label, image or decoration when dried. Exemplary solvent-based resins include phenoxy resins, polyester resins and polyurethane resins. The protective layer can be formulated to adhere to the ink layer. In some applications, an adhesion promoter, such as a polymeric aliphatic isocyanate adhesion promoter (e.g., NB 80, Nazdar Ink, Shawnee, KS), can be included in the protective layer. The protective layer also can include a wax to improve scuff resistance. The protective layer also can be or include a lacquer. For examples of protective layers that can be included over the heat transfer label containing a high-stretch energy-curable ink or coating provided herein, see U.S. Pat. Nos. 4,426,422; 5,800,656; 6,033,763; 6,083,620; 6,099,944; and 6,254,970. The protective layer generally is clear or optically transparent, although in some applications a frosted or translucent effect can be provided. The adhesive layer or the protective layer or their combination can hold the label or design together as the label or design is transferred to the container or substrate to be labelled or decorated.

The adhesive in the adhesive layer can include any suitable adhesive, and can be selected based on the substrate to which the label or design is to be applied and the application method to be used. Exemplary adhesives include a heat-activatable, polyester-based adhesive, heat-activatable thermoplastic polyamide adhesive, water-based acrylic adhesives (see, e.g., U.S. Pat. No. 6,042,931), and phenoxy adhesives (e.g., U.S. Pat. No. 6,083,620). The adhesive generally softens or melts at the temperature of application and thus stretchability of the adhesive layer generally is not a concern. In some applications, the adhesive can be selected or formulated so that the adhesive extends or elongates under the conditions of application of a HTL to an article sufficiently so that the adhesive layer not interfere with the stretch of the HTL.

In the examples below, a clear coat was first applied on a carrier, the releasing layer of a wax coated paper, using a Little Joe® offset proving press (Little Joe® Color Swatcher, Inc., Belle Mead, N.J.) and then cured by UV light under a 200 watt Hg lamp at 150 feet per minute (FPM).

Subsequently, 1-3 layers of an ink, such as a cyan ink, were applied to the cured clear coat using a Little Joe® either with an inter curing station (e.g., UV curing) or wet-on-wet without an inter curing station (e.g., UV cured in one step at the end). Subsequently, a layer of white ink was applied to the cured cyan ink layers and cured by UV light under 200 watt Hg lamp at 150 FPM. Then a heat activated adhesive coating was applied to the cured ink layer. Heat activated adhesives are known in the art (e.g., see U.S. Pat. No. 4,548,857). Examples of UV cured heat activated adhesive include JRX-1253 (commercially available from Dyna-Tech Adhesives and Coatings, Inc., of Grafton, W. Va.) and Hydro Heat Seal Adhesive 7MXWF3278 (a water-based heat activated adhesive available from Color Resolutions International, Fairfield, Ohio). The adhesive coating can be allowed to dry at room temperature for several hours until tack free, and then the print is ready to be tested on a heat transfer decoration machine.

The adhesive coating usually contains an adhesive material that can adhere the ink label or decoration to the container and the type of adhesive included in the adhesive coating can vary depending on the type of container or article to which the label or decoration is to be affixed. For example, a suitable adhesive can contain a polyamide adhesive when the substrate to be labeled or decorated is polyethylene, while suitable adhesive for a glass substrate can contain a polyester adhesive. In some applications, the adhesive coating can be omitted.

The amount of adhesive applied to the label or decoration can vary depending on the application. The adhesive can be applied in an amount of from about 0.25 to about 5 lb/ream (dry), for example, from 0.5 to 3 lb/ream or about 1 to about 1.5 lb/ream. In some applications, the adhesive is applied in register with the ink or it can extend beyond the peripheral margin of the ink of the label or decoration. The adhesive can be applied to the ink label or decoration using any suitable process, for example, by lithographic, flexographic or gravure printing.

In a preferred embodiment, the resins used in the clear coat are mainly monofunctional acrylate/methacrylate monomers/oligomers and inert resins. The clear coat also optionally can contain some (preferably <20%, more preferably <10%) difunctional and multifunctional acrylate/methacrylate monomers/oligomers to help improve cross-link density and resistance properties. The ratio of different functionality monomers and oligomers can be optimized to achieve a balance between stretchability and surface resistant properties, such as solvent resistance and scratch resistance.

The resin compositions used in the process color inks, spot color inks and white inks of the present application include a combination of monofunctional monomers and/or oligomers and/or inert resins that provide good stretchability. For example, the resin compositions can be based mainly on monofunctional (meth)acrylate monomer and/or oligomers and inert resins. Preferably, these inks contain very limited amounts of multifunctional acrylic monomer/oligomers (preferably <5%, more preferably <1%) or none at all in order to optimize stretchability and flexibility. In some applications, multifunctional monomers and/or oligomers are excluded from the inks.

The high-stretch energy curable inks and coating provided herein can be used to form a heat transfer label for application to an item, where the label includes a substrate, such as carrier web, an optional release layer applied to the substrate, and a label or decoration composition including the high-stretch energy curable ink and/or coating applied to the release layer. In use, the ink or coating on the label or decoration composition is cured using actinic radiation and then is transferred to the item using a heat transfer process, such as hot stamping or the application of heat and pressure while the label and item are in contact.

The label or decoration composition can contain one or a plurality of layers of high-stretch energy curable inks and coating provided herein. The thickness of each printed layer of the ink or coating may vary and may be adjusted to achieve, e.g., a specific thickness or color density. When flexographic or lithographic/offset printing is used to form the label or decoration, each layer can be between 0.5 to 5 microns thick; such as 0.5 µm, 1 µm, 1.5 µm, 2 µm, 2.5 µm, 3 µm, 3.5 µm, 4 µm, 4.5 µm or 5 µm thick. In some applications, the ink/coating layers are between 1 to 2 microns. The total thickness of the inks and/or coatings that are included in the label or decoration composition can vary depending on the desired color density, the technique used to apply the ink and/or coating, and the number of layers of ink/coating that the label or decoration contains. Because the energy curable inks/coating compositions provided herein can be formulated to 100% solids without VOCs, the dry film thickness and the wet film thickness of the inks/coatings could be about the same.

Provided are high stretch heat transfer label that include at least one layer of the high stretch energy curable inks or coatings provided herein, where the label exhibits at least 20% stretch without cracking. In some applications, the label exhibits 25% stretch or more without cracking. In some applications, the label includes a support portion and a transfer portion. The transfer portion can include one or more layers of the high stretch inks or coatings provided herein. The high stretch heat transfer labels also can include a release layer, such as to enhance release of the label/design/decoration created by the one or more layers of the inks/coatings from the support portion to the article to be labeled or decorated. The high stretch heat transfer labels also can include an adhesive layer, such as to improve adhesion of the label/design/decoration to the article.

1. Substrates

The energy curable inks and coatings provided herein can be printed on different substrates. The substrates generally are of a flexible material, such as a flexible polymer film or paper, such as wax paper or non-wax substrates. The paper can be a label release grade or other polymer coated paper, as is known in the art (e.g., see U.S. Pat. No. 6,939,576). The substrate also can be or include a non-silicone release layer. The substrate also can be a plastic or polymer film, such as any one of an acrylic-based film, a polyamide-based film, a polyester-based film, a polyolefin-based film such as polyethylene and polypropylene, a polyethylene naphthylene-based film, a polyethylene terephthalate-based film, a polyurethane-based film or a PVC-based film, or a combination thereof. In some applications, the substrate is selected to be a clear plastic or polymer film, which allows one to inspect the quality of the printed label or decoration by viewing the printed label or decoration through the substrate (allowing viewing of the printed label or decoration as it will appear on the labeled article), instead of looking at the printed label or decoration through an adhesive layer of the label.

2. Release Layer

The release layer can include any suitable compound or composition that facilitates the release of the heat transfer label from the carrier. Exemplary components of a release layer include a polyolefin, an olefin, an undecanoic acid copolymer, and a wax, such as beeswax, candelilla wax, a carnauba wax, a Fischer-Tropsch wax, a hydrocarbon wax, hydrogenated castor oil, montan wax, an oxidized wax, paraffin wax, a petroleum wax, or combinations thereof, where the waxes may be micronized waxes. The release layer can be applied using any method known in the art. For example, the release layer can be applied using a print unit or printer, such as a lithographic, flexographic, gravure or digital print unit or printer.

When heat is applied to the label, the release layer can facilitate transfer of the ink label or decoration to be transferred to the article. The release layer can be formulated to include ingredients that soften and/or become molten when heated, facilitating transfer of the ink label or decoration. When formulated to soften or melt at the temperature of application, stretchability of the release layer generally is not a concern. In some applications, the release layer can be selected or formulated so that the release layer extends or elongates under the conditions of application of a HTL to an article sufficiently so that the release layer not interfere with the stretch of the HTL. The release layer can serve as a protective layer for the ink label or decoration. The amount of release layer included can vary by application. The amount of release layer applied to the ink label or decoration can be up to at or about 5 lb/ream, such as from at or about 0.25 to at or about 5 lb/ream on a dry basis, or from at or about 0.5 to at or about 2.5 lb/ream on a dry basis.

An exemplary method for producing a heat transfer label includes the steps of printing at least 1 layer of an energy curable ink or coating provided herein on a substrate, such as on a release layer of a carrier film, curing the at least 1 layer of energy curable ink or coating using actinic radiation to produce a cured print, forming the cured print into a heat transfer label; and applying the heat transfer label to a substrate, where the heat transfer label can withstand 25% or more stretch without cracking. Any suitable method can be used to make a heat transfer label as described herein.

An exemplary method of producing a heat transfer label includes the steps of applying a release layer onto a carrier film, applying at least 1 layer of the energy curable high stretch inks or coatings described herein onto the release layer, curing the at least 1 layer of the ink or coating using actinic radiation to produce a cured print, and applying an adhesive layer over the cured print to form a heat transfer label. The ink or coating can be applied by any appropriate method, such as lithographic, flexographic or gravure printing.

Also provided are methods of labelling or decorating an article. An exemplary method includes providing a support, applying at least 1 layer of the energy curable high stretch inks or coatings described herein onto the support to form a heat transfer design that can contain a label or decoration or both, curing the ink or coating of the transfer design, and transferring the heat transfer design from the support to the article. The ink or coating is applied by any appropriate method, such as lithographic, flexographic or gravure printing. The ink or coating can be cured by application of ultraviolet radiation or electron beam energy or a combination thereof. In such methods, transfer of the heat transfer design to the article can include application of heat to the heat transfer design while the heat transfer design is placed into contact with the article. The methods also can include applying an adhesive layer over the transfer design prior to transfer of the design to the article or applying a release layer to the support prior to application of the ink or coating or both of these steps. The methods are particularly suited for applying a heat transfer label to non-cylindrical article, such as an article that has at least one contour or that is tapered.

Also provided are methods of labelling an article with a high stretch heat transfer label. The methods can include as steps providing a high stretch heat transfer label containing at least one layer of the energy curable high stretch inks or coatings described herein, and stretching at least a portion of the heat transfer label while transferring the heat transfer label to the article in order to improve contact between the heat transfer label and the article. The heat transfer label can be stretched by at least 20% without cracking. In some applications, the HTL can be stretched 25% or more without cracking. In some applications, the stretching step can include application of heat to the heat transfer label while the heat transfer label is placed into contact with the article.

III. Examples

The following examples, including experiments and results achieved, are provided for illustrative purposes only and are not to be construed as limiting the claimed subject matter.

Example 1

Exemplary resin compositions as described herein for use in high-stretch energy curable ink formulations were prepared. Resin 1A was prepared by mixing 60 wt % monofunctional oligomer, CN131B (an aromatic monoacrylate oligomer from Sartomer, Exton, PA) with 40 wt % inert resin, Laropal® A81(an aldehyde resin containing a condensation product of urea and aldehydes, from BASF, Cheshire, UK). Resin 1A contained no multifunctional monomer or oligomer.

Resin 1B was prepared by mixing 53 wt % monofunctional oligomer, CN131B (an aromatic monoacrylate oligomer from Sartomer, Exton, Pa.) with 47 wt % inert resin, Laropal® A81(an aldehyde resin containing a condensation product of urea and aldehydes, from BASF, Cheshire, UK). Resin 1B contained no multifunctional monomer or oligomer.

Example 2

High-stretch energy curable ink formulations were prepared for use in heat transfer label applications. The formulations provided are merely representative of the types of materials that can be incorporated into the inks/coatings and method for use in heat transfer label applications of the present application.

Preparation of High-Stretch Energy Curable Ink/Coating Formulations

Exemplary high-stretch energy curable inks were prepared. A clear coat, a process cyan ink, a process magenta ink and a white ink were prepared as described below.

Clear Coat Compositions

A clear coat composition was made according to the following formula by combining 87% of a resin composition as described herein (Resin 1A, containing 40% Laropal® A81, a condensation product of urea and aldehydes from BASF, 60% CN131B, a monoacrylate oligomer, and no multifunctional monomer or multifunctional oligomer) with a polymerization inhibitor (1% Genorad® 16), a viscosity modifier (2% CN131B, an aromatic monoacrylate oligomer); a photoinitiator (4% of a 50/50 blend of 2,4,6-trimethylbenzoyl-diphenyl phosphine oxide and 2-hydroxy-2-methyl-1-phenylpropanone solution), and additives (2% fumed silica and 4% Micro Talc IT) as shown below in Table 4. The components were mixed in a vessel until homogeneous.

TABLE 4

| Clear Coat | | | |
|---|---|---|---|
| Material | Type | Supplier | % |
| Resin composition: | | | 87 |
| 40% inert resin | Laropal ® A81 (condensation product of urea and aldehydes, an inert thermoplastic resin) | BASF | |
| 60% monofunctional oligomer | CN131B (Aromatic monoacrylate oligomer) | Sartomer | |
| 0% multifunctional monomer or oligomer | — | — | |
| Inhibitor: | | | 1 |
| Polymerization inhibitor | Genorad ® 16 | Rahn | |
| Viscosity Modifier: | | | 2 |
| low viscosity monoacrylate | CN131B | Sartomer | |
| Photoinitiator: | | | 4 |
| Photoinitiator blend | 50/50 solution of 2,4,6-trimethylbenzoyl-diphenyl phosphine oxide and 2-hydroxy-2-methyl-1-phenyl-propanone | Sun Chemical | |
| Additives: | | | |
| SiO$_2$ | Fumed silica | Wacker Silicones Corp. | 2 |
| Talc | Micro Talc IT | Mondo Minerals | 4 |
| Total | | | 100 |

Process Cyan Printing Ink

A process cyan printing ink was made according to the following formula by combining 58% of a resin composition as described herein (Resin 1A, containing 40% Laropal® A81, a condensation product of urea and aldehydes from BASF, and 60% CN131B, a monoacrylate oligomer) with a polymerization inhibitor (2% Florstab® UV-1), a viscosity modifier (13% CN131B, an aromatic monoacrylate oligomer); a photoinitiator (5% of SUN 01), pigment (13% phthalo blue) and additives (1% fumed silica, 4% Micro Talc IT and 4% kaolin clay) as shown below in Table 5. The components were mixed in a vessel until homogeneous.

TABLE 5

| Process Cyan Ink | | | |
|---|---|---|---|
| Material | Type | Supplier | % |
| Resin composition: | | | 58 |
| 40% inert resin | Laropal ® A81 (condensation product of urea and aldehydes, an inert thermoplastic resin) | BASF | |
| 60% monofunctional oligomer | CN131B (Aromatic monoacrylate oligomer) | Sartomer | |
| 0% multifunctional monomer or oligomer | — | — | |
| Inhibitor: | | | 2 |
| Polymerization inhibitor | Florstab ® UV-1 | Kromachem LTD | |

TABLE 5-continued

Process Cyan Ink

| Material | Type | Supplier | % |
|---|---|---|---|
| Viscosity Modifier: low viscosity monoacrylate | CN131B | Sartomer | 13 |
| Photoinitiator: Photoinitiator compound | SUN 01 | IGM Resins, BV | 5 |
| Pigment: Blue Pigment | Phthalo Blue | Sun Chemical | 13 |
| Additives: | | | |
| $SiO_2$ | Fumed silica | Wacker Silicones Corp. | 1 |
| Talc | Micro Talc IT | Mondo Minerals | 4 |
| Kaolin Clay | Lithosperse ® | J. M. Huber Corp. | 4 |
| Total | | | 100 |

Process Magenta Printing Ink

A process magenta printing ink was made according to the following formula by combining 50.5% of a resin composition as described herein (Resin 1B, containing 47% Laropal® A81, a condensation product of urea and aldehydes from BASF, and 53% CN131B, a monoacrylate oligomer) with a polymerization inhibitor (2% Florstab® UV-1), a viscosity modifier (13.5% CN131B, an aromatic monoacrylate oligomer); a photoinitiator (10% of SPC1), pigment (20% Irgalite® rubine) and an additive (4% Micro Talc IT) as shown below in Table 6. The components were mixed in a vessel until homogeneous.

TABLE 6

Process Magenta Ink

| Material | Type | Supplier | % |
|---|---|---|---|
| Resin composition: 47% inert resin | Laropal ® A81 (condensation product of urea and aldehydes, an inert thermoplastic resin) | BASF | 50.5 |
| 53% monofunctional oligomer | CN131B (Aromatic monoacrylate oligomer) | Sartomer | |
| 0% multifunctional monomer or oligomer | — | — | |
| Inhibitor: Polymerization inhibitor | Florstab ® UV-1 | Kromachem LTD | 2 |
| Viscosity Modifier: low viscosity monoacrylate | CN131B | Sartomer | 13.5 |
| Photoinitiator: Photoinitiator compound | SPC1 | Sun Chemical | 10 |
| Pigment: Red Pigment | Irgalite ® Rubine | Sun Chemical | 20 |
| Additives: | | | |
| Talc | Micro Talc IT | Mondo Minerals | 4 |
| Total | | | 100 |

White Printing Ink

A white printing ink was made according to the following formula by combining 29.0% of a resin composition as described herein (Resin 1A, containing 40% Laropal® A81, a condensation product of urea and aldehydes from BASF, and 60% CN131B, a monoacrylate oligomer) with a polymerization inhibitor (0.5% Genorad® 16), a viscosity modifier (11% CN131B, an aromatic monoacrylate oligomer); a photoinitiator (4% of SUN 01), pigment (50.5% titanium dioxide) and additives (4% Micro Talc IT and 1% fumed silica) as shown below in Table 7. The components were mixed in a vessel until homogeneous.

TABLE 7

White Ink

| Material | Type | Supplier | % |
|---|---|---|---|
| Resin composition: 40% inert resin | Laropal ® A81 (condensation product of urea and aldehydes, an inert thermoplastic resin) | BASF | 29.0 |
| 60% monofunctional oligomer | CN131B (Aromatic monoacrylate oligomer) | Sartomer | |
| 0% multifunctional monomer or oligomer | — | — | |
| Inhibitor: Polymerization inhibitor | Genorad ® 16 | Rahn | 0.5 |
| Viscosity Modifier: low viscosity monoacrylate | CN131B | Sartomer | 11.0 |
| Photoinitiator: Photoinitiator compound | SUN01 | IGM Resins, BV | 4.0 |
| Pigment: Titanium Dioxide | CR826 | Tronox | 50.5 |
| Additives: | | | |
| Talc | Micro Talc IT | Mondo Minerals | 4.0 |
| $SiO_2$ | Fumed silica | Wacker Silicones Corp. | 1.0 |
| Total | | | 100 |

Example 3

Test Method for Heat Transfer Labels

The printed heat transfer labels or decorations can be tested for transferability using any method known in the art. For example, in an exemplary test, the printed heat transfer labels containing the high-stretch energy curable inks and/or coatings provided herein were tested on a Therimage Dynacal Model TD-1FC heat transfer decorator 3-99-0210-06. In this method, the printed area of the carrier web first passes/contacts a preheating plate from the back of the print to be heated to a temperature around 200±50° F., then it passes/contacts a second plate set at a temperature of 350±50° F. to be further heated, and instantly the second plate also pushes the image area onto the container. The heat activated adhesive of the label or decoration is activated during this process and the image is transferred to the container with a release layer, such as a wax. It is also possible to transfer without using a release layer.

Test Method for Stretch

During the heat transfer label process described above, the ink is being stretched. By adjusting the turning speed of the container during the transfer process, the % stretch can be altered. A simple method of measuring the label before and after stretch allows for easily determining the % stretch. For example, if a test portion of the label is measured at 1 inch before stretch and then 1.25 inch after stretch, it is said to have been stretched by 25% (an increase in length of 25%). The test portion is then assessed for cracking. No visual cracking is considered a pass, while visual evidence of cracking (even small cracks) is considered a fail.

For the purposes of testing the inventive inks and method of use in heat transfer labels of the present application HDPE containers were used, but the present application is not limited to this material. Any commonly known container material or blend of container materials also could be used in the container or article to be labeled, including polymeric types (such as for example both high and low density variations of polyethylene, polypropylene, PETG, PETE, PVC, polycarbonate, acrylic, styrene, etc.); glass types; etc. This includes materials used for containers commonly used for consumer goods and seen in consumer markets, such as water, alcoholic beverages, fruit juice, soft drinks, motor oil, cooking oil, medicine, shampoo, cosmetics, personal care products, milk, etc.

Example 4

A series of print trials were performed with several variations to exhibit the ability of the inks and method of the present application to produce heat transfer labels that can withstand stretching of at least 20%, or 25% or more without cracking.

In the examples below, a first down clear coat was first applied on the releasing layer of a wax coated paper using a Little Joe® proofing press and then cured by UV light under 200 watt Hg lamp at 150FPM. Subsequently, 1-3 layers of cyan ink were applied to the cured clear coat using a Little Joe® proofing press either with inter curing station or wet-on-wet without inter curing station (cured in one step at the end). Subsequently, a layer of white ink was applied to the cured cyan ink layers and cured by UV light under 200 watt Hg lamp at 150FPM. Then Hydro Heat Seal Adhesive 7MXWF3278, a commercially available water-based heat activated adhesive, was applied to the cured ink layer. After the water evaporated and the adhesive dried at room temperature for several hours until tack free, the print is ready to be tested on a heat transfer decoration machine. All of the high-stretch energy curable inks exhibited good printability, and as indicated by the results below, good strecthability in the print trials.

Print Trial 1

In Print Trial 1, the heat transfer label was a 3 layer construction with inter-station UV cure between ink layers.

Using a Little Joe® proofing press, 6 separate prints were prepared as follows:
Layer 1—a single layer of the clear coat of Example 1 (containing Resin 1A) followed by cure using a 200 watt Hg lamp at 150 FPM.
Layer 2—a single layer of process cyan ink f Example 1 (containing Resin 1A) followed by cure using 200 watt Hg lamp at 150 FPM.
Layer 3—a single layer of white ink of Example 1 (containing Resin 1A) followed by cure using 200 watt Hg lamp at 150 FPM.
Layer 4—a single layer of Hydro Heat Seal Adhesive 7MXWF3278.
The resulting prints were then applied as heat transfer labels in accordance with the Test Method for Heat Transfer Labels described in Example 2 above and then stretched in accordance with the Test Method for Stretch described in Example 2 above.

Test Results: All 6 prints showed no cracking when stretched from 0-25%. Signs of cracking were seen when prints were stretched to 26% and above.

Example 5

Print Trial 2

In Print Trial 2, the heat transfer label was a 5 layer construction with process cyan layers printed wet-on-wet without inter-station curing between layers.

Using a Little Joe® proofing press, 4 separate prints were prepared as follows:
Layer 1—a single layer of clear coat of Example 1 (containing Resin 1A) followed by cure using 200 watt Hg lamp at 150 FPM.
Layers 2, 3, 4—three consecutive single layers of process cyan ink of Example 1 (containing Resin 1A) followed by a single cure step using 200 watt Hg lamp at 150 FPM.
Layer 5—a single layer of white ink of Example 1 (containing Resin 1A) followed by cure using 200 watt Hg lamp at 150 FPM.
Layer 6—a single layer of Hydro Heat Seal Adhesive 7MXWF3278.
The prints were then applied as heat transfer labels in accordance with the Test Method for Heat Transfer Labels described in Example 2 above and then stretched in accordance with the Test Method for Stretch described in Example 2 above.

Test Results: All 4 prints showed no cracking when stretched from 0-25%. Signs of cracking were seen when prints were stretched to 26% and above.

Example 6

Print Trial 3

In Print Trial 3, the heat transfer label was a 5 layer construction with inter-station UV curing between layers.

Using a Little Joe® proofing press, 4 separate prints were prepared as follows:
Layer 1—a single layer of clear coat of Example 1 (containing Resin 1A) followed by cure using 200 watt Hg lamp at 150 FPM.
Layers 2, 3, 4—three consecutive single layers of process cyan ink of Example 1 (containing Resin 1A) followed by cure using 200 watt Hg lamp at 150 FPM after each layer.
Layer 5—a single layer of white ink of Example 1 (containing Resin 1A) followed by cure using 200 watt Hg lamp at 150 FPM.
Layer 6—a single layer of Hydro Heat Seal Adhesive 7MXWF3278.
The prints were then applied as heat transfer labels in accordance with the Test Method for Heat Transfer Labels described in Example 2 above and then stretched in accordance with the Test Method for Stretch described in Example 2 above.

Test Results: All 4 prints showed no cracking when stretched from 0-25%. Signs of cracking were seen when prints were stretched to 26% and above.

Example 7

Comparative Print Trials

For comparative purposes, three separate trials (Trials 4, 5 and 6) were performed using Sun Chemical Starluxe® inks, including Starluxe® Process Cyan, a commercially available heat transfer label ink, printed on the releasing layer of a wax coated paper. The Starluxe® inks include 25-50% multifunctional acrylates and can contain 10-25% trimethylolpropane triacrylate and up to 2.5% 2-benzyl-2-dimethylamino-4-morpholinobutyrophenone. Thus, these commercially available inks include greater than 20 wt % multifunctional monomer or multifunctional oligomer.

Trial 4: Trial 4 (comparative) was performed under the same conditions as used in Trial 1 of Example 4 in that the heat transfer label was a 3 layer construction with inter-station UV cure between ink layers.

Using a Little Joe® proofing press, 6 separate prints were prepared as follows:
Layer 1—a single layer of Starluxe® Clear Coat followed by cure using a 200 watt Hg lamp at 150 FPM.
Layer 2—a single layer of Starluxe® Process Cyan ink followed by cure using 200 watt Hg lamp at 150 FPM.
Layer 3—a single layer of Starluxe® White ink followed by cure using 200 watt Hg lamp at 150 FPM.
Layer 4—a single layer of Hydro Heat Seal Adhesive 7MXWF3278.

The prints were then applied as heat transfer labels in accordance with the Test Method for Heat Transfer Labels described in Example 2 above and then stretched in accordance with the Test Method for Stretch described in Example 2 above.

Test Results: The prints of Trial 4 exhibited visual cracking when stretched >5%.

Trial 5: Trial 5 (comparative) was performed under the same conditions as used in Trial 2 of Example 5 in that the heat transfer label was a 5 layer construction with process cyan layers printed wet-on-wet without inter-station curing between layers.

Using a Little Joe® proofing press, 4 separate prints were prepared as follows:
Layer 1—a single layer of Starluxe® Clear Coat followed by cure using 200 watt Hg lamp at 150 FPM.
Layers 2, 3, 4—three consecutive single layers of Starluxe® Process Cyan ink followed by a single cure step using 200 watt Hg lamp at 150 FPM.
Layer 5—a single layer of Starluxe® White ink followed by cure using 200 watt Hg lamp at 150 FPM.
Layer 6—a single layer of Hydro Heat Seal Adhesive 7MXWF3278.

The prints were then applied as heat transfer labels in accordance with the Test Method for Heat Transfer Labels described in Example 2 above and then stretched in accordance with the Test Method for Stretch described in Example 2 above.

Test Results: All 4 prints of Trial 5 exhibited visual cracking when stretched >5%.

Trial 6: Trial 6 (comparative) was performed under the same conditions as used in Trial 3 of Example 6 in that the heat transfer label was a 5 layer construction with inter-station UV curing between layers.

Using a Little Joe® proofing press, 4 separate prints were prepared as follows:
Layer 1—a single layer of Starluxe® Clear Coat followed by cure using 200 watt Hg lamp at 150 FPM.
Layers 2, 3, 4—three consecutive single layers of Starluxe® Process Cyan ink followed by cure using 200 watt Hg lamp at 150 FPM after each layer.
Layer 5—a single layer of Starluxe® White ink followed by cure using 200 watt Hg lamp at 150 FPM.
Layer 6—a single layer of Hydro Heat Seal Adhesive 7MXWF3278.

The prints were then applied as heat transfer labels in accordance with the Test Method for Heat Transfer Labels described in Example 2above and then stretched in accordance with the Test Method for Stretch described in Example 2above.

Test Results: All 4 prints of Trial 6 exhibited visual cracking when stretched >5%.

In all of the print trials of the Examples, a clear coat was applied first, but this is only one preferred method for producing heat transfer labels and is not a necessity. Heat transfer labels with the clear coat as an intermediate or final layer also is possible. It also would be possible to produce heat transfer labels without any clear coat or with clear coat as the only layer. Generally, the transfer label includes a clear coat and/or an adhesive layer.

In all of the print trials of the Examples, a process cyan was used as the non-white ink, but it is understood that other process or spot colors, such as the process magenta ink described in Example 2, also could be used alone or in combination and could be printed in any configuration with other colors or with clear coat or white ink.

In all of the print trials of the Examples, a white coat was applied last but this is only a preferred method for producing heat transfer labels and is not a necessity. Heat transfer labels with white as an intermediate or final layer also is possible. It also would be possible to produce heat transfer labels without any white layer or with white as the only layer. Generally, the transfer label includes a clear coat and/or an adhesive layer.

The present invention has been described in detail, including the preferred embodiments thereof, but is more broadly applicable as will be understood by those skilled in the art. It will be appreciated that those skilled in the art, upon consideration of the present disclosure, may make modifications and/or improvements on this invention that fall within the scope and spirit of the invention. Since modifications will be apparent to those of skill in this art, it is intended that this invention be limited only by the scope of the following claims.

What is claimed is:

1. A high-stretch energy curable resin composition, comprising:
   multifunctional monomer or a multifunctional oligomer or a combination thereof in an amount from 0% to 20% based on the weight of the energy curable resin composition; and
   a blend, comprising:
     an inert resin; and
     a monofunctional monomer or a monofunctional oligomer or a combination thereof;
   wherein the inert resin is present in an amount of 20 wt % to 90 wt %, based on the total weight of the energy curable resin composition;
   wherein the inert resin is selected from the group consisting of a urea aldehyde resin, a polyester resin, an aldehyde resin, an epoxy resin, a rosin ester resin, a cellulose nitrate, a cellulose acetobutyrate, a vinyl chloride copolymer, a melamine-formaldehyde resin, a polyurethane resin, a polyimide resin, an alkyd resin, an aliphatic phthalate resin and an aromatic phthalate resin and combinations thereof; and
   wherein the blend is present in an amount that is 80% or greater based on the weight of the energy curable resin composition.

2. The resin composition of claim 1, wherein the blend is a solution comprising an inert resin dissolved in a monofunctional monomer or a monofunctional oligomer or a combination of a monofunctional monomer and a monofunctional oligomer.

3. The resin composition of claim 1, wherein the inert resin comprises an inert thermoplastic resin.

4. The resin composition of claim 1, wherein the total amount of multifunctional monomer or multifunctional oligomer or combination thereof is 10 wt % or less than based on the weight of the composition.

5. The resin composition of claim 1, wherein the total amount of multifunctional monomer or multifunctional oligomer or combination thereof is 5 wt % less based on the weight of the composition.

6. The resin composition of claim 1, wherein the total amount of multifunctional monomer or multifunctional oligomer or combination thereof is 1 wt % or less than based on the weight of the composition.

7. The resin composition of claim 1, wherein the multifunctional monomer is a difunctional monomer or oligomer selected from among alkoxylated aliphatic diacrylate, alkoxylated aliphatic dimethacrylate, alkoxylated neopentyl glycol diacrylate, alkoxylated neopentyl glycol dimethacrylate, 1,4-butanediol diacrylate, 1,4-butanediol dimethacrylate, 1,3-butylene glycol diacrylate, 1,3-butylene glycol dimethacrylate, cyclohexane dimethanol diacrylate, cyclohexane dimethanol dimethacrylate, diethylene glycol diacrylate, diethylene glycol dimethacrylate, dipropylene glycol diacrylate, dipropylene glycol dimethacrylate, 1,12-dodecanediol dimethacrylate, ethoxylated bisphenol A dimethacrylate, ethoxylated (2) bisphenol A dimethacrylate, ethoxylated (3) bisphenol A diacrylate, ethoxylated (4) bisphenol A diacrylate, ethoxylated (4) bisphenol A dimethacrylate, ethoxylated (6) bisphenol A dimethacrylate, ethoxylated (8) bisphenol A dimethacrylate, ethoxylated (10) bisphenol A diacrylate, ethoxylated (10) bisphenol A dimethacrylate, ethoxylated (30) bisphenol A diacrylate, ethoxylated (30) bisphenol A dimethacrylate, ethylene glycol dimethacrylate, 1,6-hexanediol diacrylate, 1,6-hexanediol dimethacrylate, neopentyl glycol diacrylate, neopentyl glycol dimethacrylate, polyester diacrylate, polyethylene glycol (200) diacrylate, polyethylene glycol (400) diacrylate, polyethylene glycol (400) dimethacrylate, polyethylene glycol (600) diacrylate, polyethylene glycol (600) dimethacrylate, polyethylene glycol dimethacrylate, polypropylene glycol (400) dimethacrylate, propoxylated neopentyl glycol diacrylate, propoxylated neopentyl glycol dimethacrylate, propoxylated (2) neopentyl glycol diacrylate, tetraethylene glycol diacrylate, tetraethylene glycol dimethacrylate, tricyclodecane dimethanol diacrylate, triethylene glycol diacrylate, triethylene glycol dimethacrylate, tripropylene glycol diacrylate and tripropylene glycol dimethacrylate and combinations thereof.

8. The resin composition of claim 1 that contains no multifunctional monomer or multifunctional oligomer.

9. The resin composition of claim 1, wherein the mono functional monomers or oligomers comprise acrylates or methacrylates.

10. The resin composition of claim 1, wherein the monofunctional monomers or oligomers have a tack in the range of 10-16.

11. The resin composition of claim 1, wherein the monofunctional monomers or oligomers have a Tg above 0° C.

12. The resin composition of claim 1, wherein the monofunctional monomers or oligomers have a Tg in the range of at or about 20° C. to at or about 100° C.

13. The resin composition of claim 1, wherein the monofunctional monomers or oligomers have a Tg in the range of at or about 20° C. to 25° C.

14. The resin composition of claim 1, wherein the monofunctional monomer or monofunctional oligomer is selected from among an acrylate ester, an acrylic ester, an acrylic monomer, N-acryloyl amine, N-acryloyl morpholine, aliphatic mono acrylate, aliphatic mono methacrylate, alkoxylated lauryl acrylate, alkoxylated phenol acrylate, alkoxylated tetrahydrofurfuryl acrylate $C_{12}$-$C_{14}$ alkyl methacrylate, aromatic acrylate monomer, aromatic methacrylate monomer, aromatic monoacrylate oligomer, aromatic monomethacrylate oligomer, benzyl methacrylate, caprolactone acrylate, cyclic trimethylolpropane formal acrylate, cyclo aliphatic acrylate monomer, dicyclopentadienyl methacrylate, diethylene glycol methyl ether methacrylate, epoxy acrylate, epoxy methacrylate, 2(2-ethoxy-ethoxy) ethyl acrylate, ethoxylated (4) nonyl phenol acrylate, ethoxylated (4) nonyl phenol methacrylate, ethoxylated nonyl phenol acrylate, 2-ethylhexyl methacrylate, isobomyl acrylate, isobomyl methacrylate, isodecyl acrylate, isodecyl acrylate, isodecyl methacrylate, isooctyl acrylate, isooctyl acrylate, lauryl acrylate, lauryl methacrylate, methoxy polyethylene glycol (350) monoacrylate, methoxy polyethylene glycol (350) monomethacrylate, methoxy polyethylene glycol (550) monoacrylate, methoxy polyethylene glycol (550) monomethacrylate, nonylphenylpolyoxyethylene acrylate, octyldecyl acrylate, 2-phenoxyethyl acrylate, 2-phenoxyethyl methacrylate, polyester acrylate, polyester methacrylate, polyether acrylate, polyether methacrylate, polyphenoxy acrylates, stearyl acrylate, stearyl methacrylate, tetrahydrofurfuryl acrylate, tetrahydrofurfuryl methacrylate, tridecyl acrylate, tridecyl methacrylate, triethylene glycol ethyl ether methacrylate, 3,3,5-trimethylcyclohexyl methacrylate, 3,3,5-trimethyl-cyclohexyl methacrylate, urethane acrylate, urethane methacrylate, an N-vinyl amide, N-vinylformamide and N-vinyl-pyrrolidone and combinations thereof.

15. The resin composition of claim 1, wherein the blend contains an aromatic monoacrylate oligomer.

16. The resin composition of claim 1, wherein the mono functional monomer is present in an amount between at or about 10 wt % and at or about 90 wt % based on the weight of the resin composition.

17. The resin composition of claim 1, further comprising a polymerization inhibitor.

18. The resin composition of claim 17, wherein the polymerization inhibitor comprises a benzoquinone, a benzotriazole aluminium salt amine complex, butylated hydroxytoluene, hydroquinone, hydroquinone monomethyl ether, naphthoquinone, t-butylcatechol or t-butylhydroquinone or a combination thereof.

19. An energy curable ink or coating, comprising the resin composition of claim 1.

20. The ink or coating of claim 19, wherein the resin composition is present in an amount that is from at or about 20% to at or about 80% by weight of the ink or coating.

21. The ink or coating of claim 19, further comprising a viscosity modifier.

22. The ink or coating of claim 21, wherein the viscosity modifier is present in an amount of at or about 0.1 wt % to at or about 30 wt % based on the weight of the ink or coating composition.

23. The ink or coating of claim 19, further comprising a polymerization inhibitor.

24. The ink or coating of claim 23, wherein the polymerization inhibitor comprises a benzoquinone, a benzotriazole aluminium salt amine complex, butylated hydroxytoluene, hydroquinone, hydroquinone monomethyl ether, naphthoquinone, t-butylcatechol or t-butylhydroquinone or a combination thereof.

25. The ink or coating of claim 23, wherein the polymerization inhibitor is present in an amount of at or about 0.1 wt % to at or about 3 wt % based on the weight of the ink or coating composition.

26. The ink or coating of claim 19, further comprising a photoinitiator.

27. The ink or coating of claim 26, wherein the photoinitiator comprises benzoin methyl ether, benzoin ethyl ether, benzoin phenyl ether, methylbenzoin, ethylbenzoin, propylbenzoin, butylbenzoin, pentylbenzoin, benzyl-dimethyl-ketal, 2-(o-chlorophenyl)-4,5-diphenylimidazole dimer, 2-(o-chloro-phenyl)-4,5-di(m-methoxy-phenyl)imidazole dimer, 2-(o-fluorophenyl)-4,5-phenyl-imidazole dimer, 2-(o-methoxy-phenyl)-4,5-diphenyl-imidazole dimer, 2-(p-methoxy-phenyl)-4,5-diphenyl-imidazole dimer, 2,4-di(p-methoxy-phenyl)-5-phenyl-imidazole dimer, 2-(2,4-dimethoxyphenyl)-4,5-diphenyl-imidazole dimer, 9-phenyl-acridine, 1,7-bis(9,9'-aridinyl)heptane, N-phenyl- glycine, chloro-benzophenone, 4-phenylbenzophenone, trimethyl-benzophenone, 3,3'-dimethyl-4-methoxybenzophenone, 4,4'-dimethylamino-benzophenone, 4,4'-bis(diethyl-amino)-benzophenone, acrylated benzophenone, methyl-o-benzoyl benzoate, isopropyl-thioxanthone, 2-chloro-thioxanthone, 2-ethyl-thioxanthone, 2-benzyl-2-(dimethyl-amino)-4'-morpholino-butyrophenone, hydroxbenzophenone, 2,2-dimethoxy-2-phenyl-acetophenone, 2,2-diethoxyacetophenone, 2,2-dimethoxy-2-phenylacetophene, 1- hydroxycyclohexy-lacetophenone, 2-hydroxy-2-methyl-1-phenylpropanone, 4-benzoyl-4'- methyl-diphenyl sulfide, ethyl 4-dimethyl-amino-benzoate, 2-ethyl-hydroquinone; (2,4,6- trimethyl-benzoyl)diphenyl phosphine oxide, ethyl(2,4,6-trimethyl-benzoyl-phenyl phosphinate, 1-hydroxy-cyclohexyl-phenyl ketone, 2-hydroxy-2-methyl-1-phenylpropanone, 2-hydroxy-2-methyl-1-(4-isopropylphenyl)propanone, 2-hydroxy-2-methyl-1- (4-dodecylphenyl)propanone, 2-hydroxy-2-methyl-1-phenylpropanone, 2-hydroxy-2-methyl-1 -[(2-hydroxyethoxy)-phenyl]propanone, (2,6-dimethoxy-benzoyl)-2,4,4-tri-methylpentyl phosphine oxide, 2,2-dimethoxyl-2-phenyl acetophenone, bis(2,4,6-tri-methylbenzoyl) phenyl-phosphine oxide, bis(2,6-dimethoxybenzoyl)-isooctyl-phosphine oxide or ethoxy (2,4,6-trimethyl-benzoyl)phenyl phosphine oxide or a combination thereof.

28. The ink or coating of claim 26, wherein the photoinitiator is present in an amount of at or about 0.1 wt % to at or about 15 wt % based on the weight of the ink or coating composition.

29. The ink or coating of claim 19, further comprising a pigment or dye or combination thereof.

30. The ink or coating of claim 29, wherein the pigment or dye or combination thereof is present in an amount of at or about 0.1 wt % to at or about 60 wt % based on the weight of the ink or coating composition.

31. The ink or coating of claim 19, further comprising an additive selected from among ammonia, an anti-misting agent, silica, talc, microtalc, clay, a defoamer, a dispersant, a flow agent, a lubricant, a wax, a plasticizer, a silicone, a stabilizer and a wetting agent and a combination thereof.

32. The ink or coating of claim 31, wherein the additive is present in an amount of at or about 0.1 wt % to at or about 15 wt % based on the weight of the ink or coating composition.

33. A cured ink or coating, comprising the resin composition of claim 1, wherein the cured ink or coating exhibits stretch of 25% or more without cracking.

34. An energy curable ink, comprising:
   0.1 wt % to 20 wt % pigment/dye; and
   30 wt % to 80 wt % of a resin composition of claim 1 based on the weight of the ink composition,
wherein the ink when cured exhibits stretch of 25% or more without cracking.

35. An energy curable clear coat, comprising 60 wt % to 90 wt % of a resin composition of claim 1 based on the weight of the ink composition, wherein the clear coat when cured exhibits stretch of 25% or more without cracking.

36. An energy curable white ink, comprising:
   5 wt % to 60 wt % white pigment/dye; and
   20 wt % to 50 wt % of a resin composition of claim 1 based on the weight of the ink composition,
wherein the white ink when cured exhibits stretch of 25% or more without cracking.

37. The resin composition of claim 1, wherein the monofunctional monomers or oligomers have a tack in the range of 8-20.

* * * * *